US010533075B2

(12) United States Patent
Jasinska-Walc et al.

(10) Patent No.: US 10,533,075 B2
(45) Date of Patent: Jan. 14, 2020

(54) PROCESS FOR THE PREPARATION OF A BLOCK COPOLYMER COMPRISING A FIRST POLYOLEFIN BLOCK AND A SECOND POLYMER BLOCK AND THE PRODUCTS OBTAINED THEREFROM

(71) Applicant: SABIC GLOBAL TECHNOLOGIES B.V., Bergen op Zoom (NL)

(72) Inventors: Lidia Jasinska-Walc, Eindhoven (NL); Miloud Bouyahyi, Eindhoven (NL); Robbert Duchateau, Eindhoven (NL); Lukasz Szymon Rutkowski, Gdansk (PL); Arkadiusz Zych, Gdansk (PL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 191 days.

(21) Appl. No.: 15/537,226

(22) PCT Filed: Dec. 17, 2015

(86) PCT No.: PCT/EP2015/080341
§ 371 (c)(1),
(2) Date: Jun. 16, 2017

(87) PCT Pub. No.: WO2016/097208
PCT Pub. Date: Jun. 13, 2016

(65) Prior Publication Data
US 2017/0349710 A1    Dec. 7, 2017

(30) Foreign Application Priority Data
Dec. 17, 2014   (EP) ...................................... 14198485

(51) Int. Cl.
C08G 81/02    (2006.01)
(52) U.S. Cl.
CPC .................................. C08G 81/027 (2013.01)
(58) Field of Classification Search
CPC ...... C08G 63/08; C08G 63/823; C08G 64/18; C08G 81/027; C08F 8/06
See application file for complete search history.

(56) References Cited

U.S. PATENT DOCUMENTS

| 4,414,132 | A | 11/1983 | Goodall et al. |
| 4,978,648 | A | 12/1990 | Barbé et al. |
| 5,077,357 | A | 12/1991 | Job |
| 5,106,806 | A | 4/1992 | Job |
| 5,556,820 | A | 9/1996 | Funabashi et al. |
| 6,583,237 | B1 | 6/2003 | Imuta et al. |
| 2003/0055179 | A1* | 3/2003 | Ota .......................... B32B 27/32 525/242 |
| 2004/0122192 | A1 | 6/2004 | Imuta et al. |
| 2006/0287449 | A1 | 12/2006 | Miyamoto et al. |
| 2008/0234433 | A1 | 9/2008 | Asandei |
| 2009/0048399 | A1 | 2/2009 | Reijntjens et al. |
| 2011/0028657 | A1 | 2/2011 | Clark et al. |
| 2011/0294960 | A1 | 12/2011 | Hillmyer et al. |
| 2014/0039138 | A1 | 2/2014 | Giesbrecht et al. |
| 2014/0039139 | A1 | 2/2014 | Giesbrecht et al. |
| 2014/0039140 | A1 | 2/2014 | Giesbrecht et al. |
| 2014/0200313 | A1* | 7/2014 | Chenal ..................... C08F 10/00 525/309 |
| 2014/0350200 | A1 | 11/2014 | Batinas-Geurts et al. |
| 2017/0320987 | A1 | 11/2017 | Bouyahyi et al. |
| 2017/0320988 | A1 | 11/2017 | Jasinska-Walc et al. |
| 2017/0320989 | A1 | 11/2017 | Duchateau et al. |

FOREIGN PATENT DOCUMENTS

| EP | 1186619 | A2 | 3/2002 |
| EP | 1283222 | A1 | 2/2003 |
| JP | 2001288272 | A | 10/2001 |
| WO | 9319104 | A1 | 9/1993 |
| WO | 9613529 | A1 | 5/1996 |
| WO | 9632427 | A1 | 10/1996 |
| WO | 9742232 | A1 | 11/1997 |
| WO | 9742236 | A1 | 11/1997 |
| WO | 0069921 | A1 | 11/2000 |
| WO | 0123441 | A1 | 4/2001 |
| WO | 2007134851 | A1 | 11/2007 |
| WO | 2011014533 | A1 | 2/2011 |
| WO | 2011112897 | A1 | 9/2011 |
| WO | WO-2013014383 | A1 * | 1/2013 ............. C08F 10/00 |

OTHER PUBLICATIONS

Horng et al. Polymer Preprints vol. 38, Issue 1, pp. 639-640, (Year: 1996).*
Amgoune et al., "Controlled ring-opening polymerization of lactide by group 3 metal complexes," Pure Appl. Chem., vol. 79, No. 11, pp. 2013-2030 (2007).
Amgoune et al., "Highly Active, Productive, and Syndiospecific Yttrium Initiators for the Polymerization of Racemic B-Butyrolactone," Angew. Chem. Int. Ed. 2006, 45, 2782-2784.

(Continued)

Primary Examiner — Mark S Kaucher
(74) Attorney, Agent, or Firm — Cantor Colburn LLP

(57) ABSTRACT

The present invention relates to a process for the preparation of a block copolymer comprising a first type of polyolefin block and at least one type of second polymer block, the process comprising the steps of: A) polymerizing at least one type of olefin monomer using a catalyst system to obtain a first polyolefin block containing a main group metal on at least one chain end; the catalyst system comprising: i) a metal catalyst or metal catalyst precursor comprising a metal from Group 3-10 of the IUPAC Periodic Table of elements; and ii) at least one type of chain transfer agent; and iii) optionally a co-catalyst; B) reacting the first polyolefin block containing a main group metal on at least one chain end obtained in step A) with at least one type of oxidizing agent and subsequently at least one type of metal substituting agent to obtain a first polyolefin block containing at least one functionalized chain end; C) forming at least one second polymer block on the first polyolefin block, wherein as an initiator the functionalized chain end of the first polyolefin block obtained in step B) is used to obtain the block copolymer.

12 Claims, 1 Drawing Sheet

(56) References Cited

OTHER PUBLICATIONS

Amgoune et al., "Ring-Opening Polymerization of Lactide with Group 3 Metal Complexes Supported by Dianionic Alkoxy-Amino-Bisphenolate Ligands: Combining High Activity, Productivity, and Selectivity," Chem. Eur. J. 2006, 12, 169-179.

Becquart et al., "Poly[ethylene-co-(vinyl alcohol)]-graft-poly(ε-caprolactone) Synthesis by Reactive Extrusion, 1-Structural and Kinetic Study(a)," Macromol. Mater. Eng. 2009, 294, 643-650.

Bourissou et al., "Recent advances in the controlled preparation of poly(a-hydroxy acids): Metal-free catalysts and new monomers," C.R. Chimie 10 (2007) 775-794.

Cai et al., "Stereoselective ring-opening polymerization of racemic lactide using alkoxy-amino-bis(phenolate) group 3 metal complexes," Royal Society of Chemistry 2004, Chem. Commun., 2004, 330-331.

Chamberlain et al., "Polymerization of Lactide with Zinc and Magnesium B-Diiminate Complexes: Stereocontrol and Mechanism," J. Am. Chem. Soc. 2001, 123, 3229-3238.

Chen et al., "Cocatalysts for Metal-Catalyzed Olefin Polymerization: Activators, Activation Processes, and Structure-Activity Relationships," Chem. Rev. 2000, 100, pp. 1391-1434.

Cheng et al., "Single-Site Catalysts for Ring-Opening Polymerization: Synthesis of Heterotactic Poly(lactic acid) from rac-Lactide," J. Am. Chem. Soc. 1999, 121, 11583-11584.

Choi et al., Recent Developments in Transition Metal Catalyzed Olefin Polymerization—A Survey. I. Ethylene Polymerization; JMS Review Macromolecular Chemical Physics C25(I), 1-55 (1985).

Dechy-Cabaret et al., "Controlled Ring-Opening Polymerization of Lactide and Glycolide," Chem. Rev. 2004, 104, 6147-6176.

Descour et al., "In situ compatibilisation of alkenyl-terminated polymer blends using cross metathesis," RSC Adv., 2015, 5, pp. 9658-9666.

Ferreira et al., "Tin-Catalyzed Esterification and Transesterification Reactions: A Review," International Scholarly Research Network, 2012, 13 Pages.

Han et al., "Synthesis of Hydroxy-Terminated Polyethylene via Controlled Chain Transfer Reaction and Poly(ethylene-b-caprolactone) Block Copolymer," Macromolecules 2002, 35, pp. 8923-8925.

Helwani et al., "Solid heterogeneous catalysts for transesterification of triglycerides with methanol: A review," Applied Catalysis A: General 363 (2009) 1-10.

International Search Report for International Application No. PCT/EP2015/080341; International Filing Date: Dec. 17, 2015; dated Feb. 18, 2016, 6 Pages.

Kamber et al., "Organocatalytic Ring-Opening Polymerization," Chem. Rev. 2007, 107, 5813-5840.

Kotzabasakis et al., "Synthesis and Characterization of Complex Macromolecular Architectures Based on Poly(a-olefins) Utilizing a Cs-Symmetry Hafnium Metallocene Catalyst in Combination with Atom Transfer Radical Polymerization (ATRP)," Macromolecules 2011, 44, 1952-1968.

Kricheldorf, "Syntheses of Biodegradable and Biocompatible Polymers by Means of Bismuth Catalysts," Chem. Rev. 2009, 109, 5579-5594.

Labourdette et al., "Unusually Stable Chiral Ethyl Zinc Complexes: Reactivity and Polymerization of Lactide," Organometallics 2009, 28, 1309-1319.

Lee et al., "Heterogeneous Base Catalysts for Transesterification in Biodiesel Synthesis," Catal. Surv. Asia (2009) 13:63-77.

Lou et al., "Novel Aliphatic Polyesters Based on Functional Cyclic (Di)Esters," Macromol. Rapid Commun. 2003, 24, 161-172.

Lu et al., "Syntheses of diblock copolymers polyolefin-b-poly(ε-caprolactone) and their applications as the polymeric compatilizer," Polymer 46 (2005) 10585-10591.

Machine Translation of JP2001288272A; Date of Publication: Oct. 16, 2001; 33 Pages.

Makio et al., "Synthesis of Telechelic Olefin Polymers via Catalyzed Chain Growth on Multinuclear Alkylene Zinc Compounds," J. Am. Chem. Soc; 2013, pp. 8177-8180, vol. 135.

Martinez et al., "Ring-opening metathesis polymerization of 8-membered cyclic olefins," Polym. Chem., 2014, 5, pp. 3507-3532.

Nakano et al., "Metal-catalyzed synthesis of steroregular polyketones, polyesters, and polycarbonates," The Royal Society of Chemistry 2003, Dalton Trans., 2003, 4039-4050.

Nomura et al., "Stereoselective Ring-Opening Polymerization of a Racemic Lactide by Using Achiral Salen- and Homosalen-Aluminum Complexes," Chem. Eur. J. 2007, 13, 4433-4451.

O'Keefe et al., "Polymerization of lactide and related cyclic esters by discrete metal complexes," J. Chem. Soc., Dalton Trans., 2001, 2215-2224.

Otera et al., "Esterification: Methods, Reactions, and Applications," Wiley-VCH (2010) 54 Pages.

Otera, "Transesterification," Chem. Rev. 1993, 93, pp. 1449-1470.

Ovitt et al., "Stereochemistry of Lactide Polymerization with Chiral Catalysts: New Opportunities for Stereocontrol Using Polymer Exchange Mechanisms," J. Am. Chem. Soc. vol. 124, No. 7, 2002, pp. 1316-1326.

Ovitt et al., "Stereoselective Ring-Opening Polymerization of meso-Lactide: Synthesis of Syndiotactic Poly(lactic acid)," J. Am. Chem. Soc. 1999, 121, 4072-4073.

Pullukat & Hoff, "Silica-Based Ziegler-Natta Catalysts: A Patent Review," Catal. Rev. -Sci. Eng., 41(3&4), pp. 389-428 (1999).

Qi-Zheng Li et al., "Well-Defined Polyolefin/Poly(ε-caprolactone) Diblock Copolymers: New Synthetic Strategy and Application," Journal of Polymer Science: Part A: Polymer Chemistry, pp. 511-517.

Spassky et al., "Highly steroelective polymerization of rac-(D,L)-lactide with a chiral Schiff's base/aluminum alkozide initiator," Macromol. Chem. Phys. 197, 2627-2637 (1996).

Williams et al., "A Highly Active Zinc Catalyst for the Controlled Polymerization of Lactide," J. Am. Chem. Soc., vol. 125, No. 37, 2003, 11350-11359.

Written Opinion of the International Searching Authority for International Application No. PCT/EP2015/080341; International Filing Date: Dec. 17, 2015; dated Feb. 18, 2016; 7 Pages.

Wu et al., "Recent developments in main group metal complexes catalyzed/initiated polymerization of lactides and related cyclic esters," Coordination Chemistry Reviews 250 (2006) 602-626.

Zhao et al., "Synthesis of well-defined amphiphilic branched polyethylene-graft-poly (N-isopropylacrylamide) copolymers by coordination copolymerization in tandem with RAFT polymerization and their selfassembled vesicles," Polym. Chem., 2014, 5, 962-970.

Zheng et al., "Zinc and enolato-magnesium complexes based on bi-, tri- and tetradentate aminophenolate ligands," New J. Chem., 2008, 32, 2279-2291.

Zhu et al., "Group 13 and Lanthanide Complexes Supported by Tridentate Tripodal Triamine Ligands: Structural Diversity and Polymerization Catalysis," Organometallics 2007, 26, 5395-5405.

Kashiwa et al. Journal of Polymer Science: Part A: Polymer Chemistry, vol. 41, 3657-3666 (Year: 2003).

* cited by examiner

| Formula | Structure |
|---|---|
| I-A | $X = Y$ |
| I-B | $X \equiv Y$ |
| I-C | $Y = X = Z^1$ |
| I-D | $Y - X \equiv Z^1$ |
| I-E | $\begin{array}{c} Z^1 \\ \diagup \diagdown \\ X - Y \end{array}$ |
| I-F | $\begin{array}{c} Z^1 \\ \mid \\ X \\ \diagup \diagdown \\ Y \quad Z^2 \end{array}$ (Y=X) |
| I-G | $\begin{array}{c} Z^1 \\ \parallel \\ X \\ \diagup \diagdown \\ Y \quad Z^2 \end{array}$ (Y=X=Z²) |

PROCESS FOR THE PREPARATION OF A BLOCK COPOLYMER COMPRISING A FIRST POLYOLEFIN BLOCK AND A SECOND POLYMER BLOCK AND THE PRODUCTS OBTAINED THEREFROM

CROSS REFERENCE TO RELATED APPLICATIONS

This application is a 371 of International Application No. PCT/EP2015/080341, filed Dec. 17, 2015, which claims priority to European Application No. 14198485.6, filed Dec. 17, 2014 which are incorporated herein by reference in their entirety.

The present invention relates to a process for the preparation of a block copolymer comprising a first polyolefin block and at least one second polymer block and the products obtained therefrom.

BACKGROUND

The present invention relates to the preparation of block copolymers comprising a first polyolefin block and at least one second polar or nonpolar polymer block and the products obtained therefrom.

Block copolymers combining a polyolefin block with a polyethylene-like polymer block are useful as compatibilizers for blends of e.g. polyethylene (PE) and other polyolefins (e.g. iPP). The preparation of actual polyolefin-PE block copolymers (e.g. iPP-PE) is a very tedious process that requires a living catalyst or a chain transfer polymerization process including intermediate venting steps to produce block copolymers consisting of well-defined iPP and PE blocks.

Block copolymers combining a polyolefin block with at least one polar polymer block may be used to enhance the properties of polyolefin polymers that have an inherent nonpolar character that leads to drawbacks for certain applications, because of poor adhesion, printability and compatibility that can restrict their efficacy. Furthermore, block copolymers combining a polyolefin block with a polar polymer block are useful as compatibilizers for blends of e.g. polyolefins (e.g. iPP) and polar polymers (e.g. polyester or polycarbonate).

In the prior art different approaches have been reported for the preparation of polyolefin-based block copolymers, based on either living catalysts or chain transfer concepts for polymerizations mediated by homogeneous single-site catalysts.

Chain transfer agents create a controlled, living-like system and have at least one weak chemical bond that can be broken to allow the growing polymer chain to transfer to this agent.

WO 2011/014533 of Dow Global Technologies discloses the use of a multifunctional chain transfer agent that can be used in preparing polyethylene-b-polycaprolactone copolymers.

For example, polyolefin-polar or polyolefin-nonpolar block copolymers can be obtained by first preparing two separate blocks and subsequently coupling these blocks. Another way of preparing them consists of using a polyolefin having a functional end group as initiator to grow a polymer from it.

It is an aim of the present invention to provide a catalyst system allowing efficient chain transfer in the preparation of metal-functionalized polyolefins, which after oxidation and subsequent metal substitution provides chain-end-functionalized polyolefins which can be applied as initiators for the formation of polyolefin-based block copolymers.

It is moreover an aim of the present invention to produce A-B or A-B-C- . . . type di-, tri or multiblock copolymers having one polyolefin block (A) and at least one polar or polyethylene-like polymer block (B and/or C).

It is moreover an aim of the present invention to produce B-A-B or . . . -C-B-A-B-C- . . . tri-, penta- or multiblock copolymers having a central polyolefin block (A) flanked on each side by at least one other polymer block, either polar or nonpolar (B and/or C).

It is moreover an aim of the present invention to provide polymers that can be used as compatibilizers for blends of polyolefins (e.g. iPP) with polar polymers such as polycarbonate or nonpolar polymers such as PE.

One or more of these aims are obtained by the process according to the present invention.

SUMMARY OF THE INVENTION

The present invention relates to the novel and inventive process for the preparation of block copolymers having a first polyolefin block and at least one second polymer block and the block copolymers obtained therefrom.

In a first aspect, the present invention relates to a process for the preparation of a block copolymer comprising a type of first polyolefin block and at least one type of second polymer block, the process comprising the steps of:

A) polymerizing at least one type of olefin monomer using a catalyst system to obtain a first polyolefin block containing a main group metal on at least one chain end; the catalyst system comprising:
   i) a metal catalyst or metal catalyst precursor comprising a metal from Group 3-10 of the IUPAC Periodic Table of elements; and
   ii) at least one type of chain transfer agent; and
   iii) optionally a co-catalyst;
B) reacting the first polyolefin block containing a main group metal on at least one chain end obtained in step A) with at least one type of oxidizing agent and subsequently at least one type of metal substituting agent to obtain a first polyolefin block containing at least one oxidized chain end;
C) forming at least one second polymer block on the first polyolefin block, wherein as an initiator the oxidized chain end of the first polyolefin block obtained in step B) is used to obtain the block copolymer.

Step C) may be carried out for example by ring-opening polymerization (ROP) using at least one cyclic monomer and/or transesterification of a transesterifiable polymer.

In an embodiment, step C) may comprise two sub-steps so that e.g. a triblock or pentablock copolymer is formed (A-B-C or C-B-A-B-C, wherein A is a polyolefin and B and C are both polymer blocks with different monomers).

According to invention, step B) may be carried out for example directly after step A).

According to invention, step C) may be carried out for example directly after step B).

According to invention, step B) may be carried out directly after step A) and step C) may be carried out directly after step B).

According to invention, steps A), B) and C) may be carried out in a series of connected reactors, preferably continuously.

Step C) may be carried out for example by ring opening polymerization (ROP) or transesterification.

During step C) a catalyst for ROP or transesterification reactions may be used.

In yet another embodiment, the metal catalyst or metal catalyst precursor used in step A) comprises a metal from Group 3-8, preferably Group 3-6, more preferably from Group 3-4 of the IUPAC Periodic Table of elements.

In yet another embodiment, the metal catalyst or metal catalyst precursor used in step A) comprises a metal selected from the group consisting of Ti, Zr, Hf, V, Cr, Fe, Co, Ni, Pd, preferably Ti, Zr or Hf.

In yet another embodiment, the co-catalyst is selected from the group consisting of MAO, DMAO, MMAO, SMAO and fluorinated aryl borane or fluorinated aryl borate.

In yet another embodiment, the at least one olefin monomer used in step A) is selected from the group consisting of ethylene, propylene, 1-butene, 4-methyl-1-pentene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-cyclopentene, cyclohexene, norbornene, ethylidene-norbornene, and vinylidene-norbornene and one or more combinations thereof.

In yet another embodiment, the cyclic monomer used during ROP in step C) to obtain the block copolymer is a polar monomer, selected from the group consisting of a lactone, a lactide, a cyclic oligoester (e.g. a di-ester, a tri-ester, a tetra-ester, a penta-ester or higher oligoesters), an epoxide, an aziridine, a combination of epoxide and/or aziridine and $CO_2$, a cyclic anhydride, a combination of epoxide and/or aziridine and a cyclic anhydride, a combination of epoxide and/or aziridine and $CO_2$ and a cyclic anhydride, a cyclic N-carboxyanhydride, a cyclic carbonate, a lactam and one or more combinations thereof.

In yet another embodiment, the cyclic monomer used during ROP in step C) to obtain the block copolymer is a cyclic monomer comprising a carbonyl group-containing functionality and at least 10 consecutive carbon atoms in the ring/cycle. Such monomer can preferably be selected from the group consisting of cyclic esters, cyclic carbonates, cyclic amides, cyclic urethanes and cyclic ureas; or one or more combinations thereof.

In yet another embodiment, the second polymer added in step C comprises at least carboxylic or carbonic acid ester functionality or a carbonyl group-containing functionality is selected from the group consisting of a polyester, a polycarbonate, a polyamide, a polyurethane, a polyurea, a random or block poly(carbonate-ester), poly(carbonate-ether), poly(ester-ether), poly(carbonate-ether-ester), poly(ester-amide), poly(ester-ether-amide), poly(carbonate-amide), poly(carbonate-ether-amide), poly(ester-urethane), poly(ester-ether-urethane), poly(carbonate-urethane), poly(carbonate-ether-urethane), poly(ester-urea), poly(ester-ether-urea), poly(carbonate-urea), poly(carbonate-ether-urea), poly(ether-amide), poly(amide-urethane), poly(amide-urea), poly(urethane-urea) or one or more combination thereof.

In yet another embodiment, the chain transfer agent is a main group metal hydrocarbyl or a main group metal hydride, preferably selected from the group consisting of: hydrocarbyl aluminum, hydrocarbyl magnesium, hydrocarbyl zinc, hydrocarbyl gallium, hydrocarbyl boron, hydrocarbyl calcium, aluminum hydride, magnesium hydride, zinc hydride, gallium hydride, boron hydride, calcium hydride and one or more combinations thereof.

In yet another embodiment, the chain transfer agent is selected from the group consisting of trialkyl boron, dialkyl boron halide, dialkyl boron hydride, diaryl boron hydride, dialkyl boron alkoxide, dialkyl boron aryloxide, dialkyl boron amide, dialkyl boron thiolate, dialkyl boron carboxylate, dialkyl boron phosphide, dialkyl boron mercaptanate, dialkyl boron siloxide, dialkyl boron stannate, alkyl boron dialkoxide, alkyl boron diaryloxide, alkyl boron dicarboxylate, alkyl boron diphosphide, alkyl boron dimercaptanate, alkyl boron disiloxide, alkyl boron distannate, boron hydride dialkoxide, boron hydride diaryloxide, boron hydride diamide, boron hydride dicarboxylate, boron hydride diphosphide, boron hydride dimercaptanate, boron hydride disiloxide, boron hydride distannate, trialkyl aluminum, dialkyl aluminum halide, dialkyl aluminum hydride, dialkyl aluminum alkoxide, dialkyl aluminum aryloxide, dialkyl aluminum amide, dialkyl aluminum thiolate, dialkyl aluminum carboxylate, dialkyl aluminum phosphide, dialkyl aluminum mercaptanate, dialkyl aluminum siloxide, dialkyl aluminum stannate, alkyl aluminum dialkoxide, alkyl aluminum diaryloxide, alkyl aluminum dicarboxylate, alkyl aluminum diphosphide, alkyl aluminum dimercaptanate, alkyl aluminum disiloxide, alkyl aluminum distannate, aluminum hydride dialkoxide, aluminum hydride diaryloxide, aluminum hydride diamide, aluminum hydride dicarboxylate, aluminum hydride diphosphide, aluminum hydride dimercaptanate, aluminum hydride disiloxide, aluminum hydride distannate, trialkyl gallium, dialkyl gallium halide, dialkyl gallium hydride, dialkyl gallium alkoxide, dialkyl gallium aryloxide, dialkyl gallium amide, dialkyl gallium thiolate, dialkyl gallium carboxylate, dialkyl gallium phosphide, dialkyl gallium mercaptanate, dialkyl gallium siloxide, dialkyl gallium stannate, dialkyl magnesium, diaryl magnesium, alkyl magnesium halide, alkyl magnesium hydride, alkyl magnesium alkoxide, alkyl magnesium aryloxide, alkyl magnesium amide, alkyl magnesium thiolate, alkyl magnesium carboxylate, alkyl magnesium phosphide, alkyl magnesium mercaptanate, alkyl magnesium siloxide, alkyl magnesium stannate, dialkyl calcium, alkyl calcium halide, alkyl calcium hydride, alkyl calcium alkoxide, alkyl calcium aryloxide, alkyl calcium amide, alkyl calcium thiolate, alkyl calcium carboxylate, alkyl calcium phosphide, alkyl calcium mercaptanate, alkyl calcium siloxide, alkyl calcium stannate, dialkyl zinc, alkyl zinc halide, alkyl zinc hydride, alkyl zinc alkoxide, alkyl zinc aryloxide, alkyl zinc amide, alkyl zinc thiolate, alkyl zinc carboxylate, alkyl zinc phosphide, alkyl zinc mercaptanate, alkyl zinc siloxide, alkyl zinc stannate, and or more combinations thereof, preferably trimethyl aluminum (TMA), triethyl aluminum (TEA), tri(i-butyl) aluminum (TIBA), di(isobutyl) aluminum hydride, di(n-butyl) magnesium, n-butyl(ethyl)magnesium, benzyl calcium 2,6-di(t-butyl)-4-methyl-phenoxide, dimethyl zinc, diethyl zinc, trimethyl gallium, or triethylboron, 9-borabicyclo(3.3.1)nonane, catecholborane, and diborane and one or more combination thereof.

In yet another embodiment, the at least one oxidizing agent in step B) is selected from the group consisting of $O_2$, CO, $O_3$, $CO_2$, $CS_2$, COS, $R^2NCO$, $R^2NCS$, $R^2NCNR^3$, $CH_2=C(R^2)C(=O)OR^3$, $CH_2=C(R^2)(C=O)N(R^3)R^4$, $CH_2=C(R^2)P(=O)(OR^3)OR^4$, $N_2O$, $R^2CN$, $R^2NC$, epoxide, aziridine, cyclic anhydride, $R^3R^4C=NR^2$, $SO_3$, and $R^2C(=O)R^3$, or a combination of $NH_3$ and NaClO or a combination of $H_2O_2$ and NaOH, where $R^2$, $R^3$, $R^4$, $R^5$ and $R^6$ are each independently selected from hydrogen or $SiR^7_3$, $SnR^7_3$ or a C1-C16 hydrocarbyl, preferably selected from hydrogen or C1-16 hydrocarbyl; where each $R^7$ is independently selected from hydride, halide or C1-C16 hydrocarbyl.

In yet another embodiment, the at least one oxidizing agent in step B) is selected from the group consisting of $O_2$, $O_3$, $N_2O$, epoxide, aziridine, $CH_2=C(R^2)C(=O)OR^3$, $CH_2=C(R^2)(C=O)N(R^3)R^4$, $CH_2=C(R^2)P(=O)(OR^3)OR^4$, $R^2C(=O)R^3$, $R^3R^4C=NR^2$, a combination of $NH_3$ and NaClO or a combination of $H_2O_2$ and NaOH.

In another aspect, the present invention relates to a block copolymer obtained by or obtainable by a process according to the present invention.

Definitions

The following definitions are used in the present description and claims to define the stated subject matter. Other terms not cited below are meant to have the generally accepted meaning in the field.

"functionalized polyolefins" as used in the present description means: a polyolefin having a functional group, preferably containing a heteroatom different from carbon and/or hydrogen, on one or both of the ends of the polymer.

"block" as used in the present description means: a portion of a polymer that has at least one feature which is not present in the adjacent block(s)/portion(s). A block should have a sequence of monomers corresponding to a number average molecular weight ($M_n$) of at least 500 g/mol.

"block copolymer" as used in the present description means: a polymer comprising at least two blocks. For example, a block copolymer is an AB diblock or BAB triblock copolymer consisting of two different blocks, a first block (A) and a second block (B).

"first polyolefin block" as used in the present description means: a polyolefin that is functionalized on one or more chain ends. The term "first" is to specify that it is the first block to be formed of the copolymer. The "first polyolefin block" can refer to the metal functionalized polyolefin (block) obtained in step A) or the metal-functionalized oxidized polyolefin (block) obtained in step B).

"hydrocarbyl" as used in the present description means: a substituent containing hydrogen and carbon atoms; it is a linear, branched or cyclic saturated or unsaturated aliphatic substituent, such as alkyl, alkenyl, alkadienyl and alkynyl; alicyclic substituent, such as cycloalkyl, cycloalkadienyl cycloalkenyl; aromatic substituent, such as monocyclic or polycyclic aromatic substituent, as well as combinations thereof, such as alkyl-substituted aryls and aryl-substituted alkyls. It may be substituted with one or more non-hydrocarbyl, heteroatom-containing substituents. Hence, when in the present description "hydrocarbyl" is used it can also be "substituted hydrocarbyl", unless stated otherwise. Included in the term "hydrocarbyl" are also perfluorinated hydrocarbyls wherein all hydrogen atoms are replaced by fluorine atoms. A hydrocarbyl may be present as a group on a compound (hydrocarbyl group) or it may be present as a ligand on a metal (hydrocarbyl ligand).

"second polymer block" as used in the present description means: a polymer that is prepared by polymerization from one or more chain ends of an oxidized first polyolefin block or by transesterification onto one or more chain ends of an oxidized first polyolefin block. The term "second" is to specify that it is the second block to be formed of the copolymer. The second polymer block can thereby also be a random or block copolymer comprising at least two different monomers.

"polyethylene-like block" or "polyethylene-like polymer" or "polyethylene-like polymer block" as used in the present description refers a polymer or polymer block that is at least partially miscible with polyethylene, that includes but is not limited to for example polyethylene-like polyester blocks. Such kind of polymers or polymer blocks may contain at least 60 mol % of monomer units with at least 10 consecutive carbon atoms between carbonyl group-containing functionalities. So, in the context of the present invention, polyethylene-like polymers considered to be nonpolar.

"ring-opening polymerization" or "ROP" as used in the present description means: a form of chain-growth polymerization where cyclic monomers are ring-opened and enchained to form a polymer or polymer block. It also includes the copolymerization of cyclic monomers with carbon dioxide (e.g. epoxide+$CO_2$).

"Pol" as used in the present description means: polyolefin.

"PE" as used in the present description means: polyethylene.

"LDPE" as used in the present description means: low density polyethylene and "LLDPE" as used in the present description means: linear low density polyethylene. LDPE and LLDPE thereby encompass polyethylene with a density for example between 0.85 and 0.95 kg/m³, that can thus also includes especially for example VLDPE and MDPE.

"HDPE" as used in the present description means: high density polyethylene.

"CL" as used in the present description means: ε-caprolactone.

"PCL" as used in the present description means: polycaprolactone.

"PLA" as used in the present description means: polylactide (L, D or DL lactide can be used).

"aPP" as used in the present description means: atactic polypropylene.

"iPP" as used in the present description means: isotactic polypropylene.

"sPP" as used in the present description means: syndiotactic polypropylene.

"EB" as used in the present description means: cyclic ethylene brassylate.

"PEB" as used in the present description means: polyethylene brassylate.

"Amb" as used in the present description means: ambrettolide.

"PAmb" as used in the present description means: polyambrettolide.

"BA" as used in the present description means: cyclic butylene adipate.

"PBA" as used in the present description means: polybutyladipate.

"BS" as used in the present description means: cyclic butylene succinate.

"PBS" as used in the present description means: polybutylsuccinate.

"aPS" as used in the present description means: atactic polystyrene.

"iPS" as used in the present description means: isotactic polystyrene.

"sPS" as used in the present description means: syndiotactic polystyrene.

"PDL" as used in the present description means: pentadecalactone.

"PPDL" as used in the present description means: polypentadecalactone.

"PS" as used in the present description means: polystyrene.

"4M1P" as used in the present description means: 4-methyl-1-pentene.

"P4M1P" as used in the present description means: poly-4-methyl-1-pentene.

"iP4M1P" as used in the present description means: isotactic poly-4-methyl-1-pentene.

"-b-" as used in the present description means: block copolymer, e.g. HDPE-b-PCL is a copolymer with a HDPE block and PCL block.

"-co-" as used in the present description means: random copolymer, e.g. poly(CL-co-PDL) is a random copolymer of caprolactone (CL) and pentadecalactone (PDL).

"transesterification" as used in the present description means: a reaction in which a nucleophile attached to a carbonyl group-containing functionality is replaced by another nucleophile.

"transesterification" as used in the present description means: a process of exchanging a nucleophilic alkoxide group of a carboxylic or carbonic acid ester. Transesterification is a special type of transesterification using an ester or carbonate functional group.

"carboxylic acid ester functionality" as used in the present description means: an ester group (—O—C(=O)—) bonded to an organic hydrocarbyl group.

"carbonic acid ester functionality" as used in the present description means: a carbonate group (—O—C(=O)—O—) bonded to an organic hydrocarbyl group R'.

"carbonyl group-containing functionality" as used in the present description means: a carbonyl (>C=O) group bonded to organic heteroatom-containing group XR', wherein X is selected from O, S, and NR" wherein R' and R" are hydrogen or hydrocarbyl and wherein the carbonyl group is attached to the heteroatom. In the context of the present invention preferably, the second polymer block comprises as the carbonyl group-containing functionality at least one carboxylic acid ester, carbonic acid ester, amide, urethane or urea functionality. The term carbonyl group-containing functionality also includes carboxylic and carbonic acid ester functionalities in addition to other functionalities. A carbonyl group-containing functionality does therefore preferably refer to a reactive carbonyl group-containing functionality. In the sense of the present invention, it can accordingly preferably not refer to a ketone.

"cyclic ester" as used in the present description means: an ester compound in cyclic form.

"cyclic oligoester" as used in the present description means: a cyclic di-ester, a cyclic tri-ester, a cyclic tetra-ester or a cyclic penta-ester or higher oligomers. These are special forms of a cyclic ester and are encompassed by the definition of cyclic ester.

"lactone" as used in the present description means: a cyclic ester of a hydroxycarboxylic acid. This is encompassed by the definition of cyclic ester.

"oligolactone" as used in the present description means: a di-lactone, a tri-lactone, a tetra-lactone, a penta-lactone or a higher oligomeric lactone. These are special forms of a lactone and are encompassed by the definition of lactone.

"macrolactone" as used in the present description means: a macrocyclic lactone, being a lactone comprising an ester-functionality and at least 10 consecutive carbon atoms the ring/cycle. These are special forms of a lactone and are encompassed by the definition of lactone.

"macrooligolactones" as used in the present description means: a mixture of cyclic macromono-, macrodi, macritori-, macrotetra- and macropenta-lactones or higher oligomers. These are special forms of a macrolactone and are encompassed by the definition of macrolactone.

"cyclic amide" as used in the present description means: an amide compound in cyclic form. It also encompasses cyclic oligoamides being a cyclic di-amide, a cyclic tri-amide, a cyclic tetra-amide, a cyclic penta-amide or higher cyclic oligomeric amides.

"cyclic carbonate" as used in the present description means: a carbonate compound in cyclic form. It also encompasses cyclic oligocarbonates being a cyclic di-carbonate, a cyclic tri-carbonate, a cyclic tetra-carbonate, a cyclic penta-carbonate or higher cyclic oligomeric carbonates.

"cyclic urethane" as used in the present description means: a urethane compound in cyclic form. It also encompasses cyclic oligourethanes being a cyclic di-urethane, a cyclic tri-urethane, a cyclic tetra-urethane, a cyclic penta-urethane or a higher cyclic oligomeric urethane.

"cyclic ureas" as used in the present description means: a urea compound in cyclic form. It also encompasses cyclic oligoureas being a cyclic di-urea, a cyclic tri-urea, a cyclic tetra-urea, a cyclic penta-urea or higher cyclic oligomeric ureas.

"degree of chain-end-functionalization" as used in the present description means: the percentage of the original main group metal-functionalized first polyolefin block that has been oxidized to form the main group metal-functionalized oxidized first polyolefin block.

"HT SEC" as used in the present description means: high temperature size exclusion chromatography. Size exclusion chromatography can be used as a measure of both the size and the polydispersity of a polymer.

"polydispersity index (Đ)" as used in the present description means: a value that indicates the distribution of the sizes of polymer molecules ($M_w/M_n$). The method of measuring the Đ is explained below. $M_n$ is the number average molecular weight and $M_w$ is the weight average molecular weight.

"chain transfer polymerization" as used in the present description means: a polymerization reaction by which the growing polymer chain is transferred to another molecule, being the chain transfer agent. During this process a hydrocarbyl group is transferred back to the active catalyst. This process can either be reversible or irreversible. When reversible, the chain transfer agents create a controlled, living-like system.

"chain transfer agent" as used in the present description means: at lease one compound that is capable of reversibly or irreversibly interchanging hydrocarbyls and/or hydrocarbyl chains with the active catalyst. It is a metal compound comprising at least one ligand with a weak chemical bond.

"hydrocarbyl chain transfer agent" as used in the present description means: a chain transfer agent having at least one hydrocarbyl as ligand.

"additional chain transfer agent" as used in the present description means: a chain transfer agent that is present in addition to another chain transfer agent.

"chain shuttling agent" as used in the present description means: at least one compound that is capable of reversibly interchanging hydrocarbyls and/or hydrocarbyl chains between the catalysts and a chain transfer agent. It is a metal compound comprising at least one ligand with a weak chemical bond.

"catalyst system" as used in the present description means: a combination of at least two components selected from the group consisting of: a metal catalyst or a metal catalyst precursor, a co-catalyst, one or more types of chain transfer agents, etc. A catalyst system always includes a metal catalyst or a metal catalyst precursor.

"catalyst" as used in the present description means: a species providing the catalytic reaction.

"metal catalyst" as used in the present description means: a catalyst comprising at least one metal center that forms the active site. In the context of the present invention a "metal catalyst" is the same as a "transition metal catalyst" wherein the metal is a transition metal.

"metal catalyst precursor" as used in the present description means: a compound that upon activation forms the active metal catalyst.

"metallocene" as used in the present description means: a metal catalyst or metal catalyst precursor typically consisting of two substituted cyclopentadienyl (Cp) ligands bound to a metal active site.

"transition metal" as used in the present description means: a metal from any of the Groups 3-10 of the IUPAC Periodic Table of elements or in other words a Group 3 metal, a Group 4 metal, a Group 5 metal, a Group 6 metal, a Group 7 metal, a Group 8 metal, a Group 9 metal or a Group 10 metal.

"Group 3 metal" as used in the present description means: a metal selected from Group 3 of the IUPAC Periodic Table of elements, being scandium (Sc), yttrium (Y), lanthanum (La) and other lanthanides (Ce—Lu), and actinium (Ac) and other actinides (Th—Lr).

"Group 4 metal" as used in the present description means: a metal selected from Group 4 of the IUPAC Periodic Table of elements, being titanium (Ti), zirconium (Zr) and hafnium (Hf).

"Group 5 metal" as used in the present description means: a metal selected from Group 5 of the IUPAC Periodic Table of elements, being vanadium (V), niobium (Nb) and tantalum (Ta).

"Group 6 metal" as used in the present description means: a metal selected from Group 6 of the Periodic Table of elements, being chromium (Cr), molybdenum (Mo) and tungsten (W).

"Group 7 metal" as used in the present description means: a metal selected from Group 7 of the Periodic Table of elements, being manganese (Mn), technetium (Tc) and rhenium (Re).

"Group 8 metal" as used in the present description means: a metal selected from Group 8 of the Periodic Table of elements, being iron (Fe), ruthenium (Ru) and osmium (Os).

"Group 9 metal" as used in the present description means: a metal selected from Group 9 of the Periodic Table of elements, being cobalt (Co), rhodium (Rh) and iridium (Ir).

"Group 10 metal" as used in the present description means: a metal selected from Group 10 of the Periodic Table of elements, being nickel (Ni), palladium (Pd) and platinum (Pt).

"main group metal" as used in the present description means: a metal that is an element of Groups 1, 2, and 13-15 of the period table. In other words, metals of:
Group 1: lithium (Li), sodium (Na), and potassium (K)
Group 2: beryllium (Be), magnesium (Mg), and calcium (Ca)
Group 13: boron (B), aluminum (Al), gallium (Ga), and indium (In)
Group 14: germanium (Ge), and tin (Sn)
Group 15: antimony (Sb), and bismuth (Bi)
main group metals also include for the context of the present invention zinc (Zn), of the IUPAC Periodic Table of elements.

"co-catalyst" as used in the present description means: a compound that activates the metal catalyst precursor to obtain the active metal catalyst.

"oxidizing agent" as used in the present description means: an agent or a reagent that is suitable for functionalizing main group metal-functionalized first polyolefin block by oxidizing the bond between the main group metal center and the polyolefin.

"metal substituting agent" as used in the present description means: an agent or a reagent that is suitable for substituting the metal of by a non-metal atom or group. It may for example be a hydrolyzing agent.

"methylaluminoxane" or "MAO" as used in the present description means: a compound derived from the partial hydrolysis of trimethyl aluminum that serves as an co-catalyst for catalytic olefin polymerization.

"SMAO" as used in the present description means: supported methylaluminoxane, viz. a methylaluminoxane bound to a solid support.

"DMAO" as used in the present description means: depleted methylaluminoxane, viz. a methylaluminoxane from which the free trimethyl aluminum has been removed.

"MMAO" as used in the present description means: modified methylaluminoxane, viz. the product obtained after partial hydrolysis of trimethyl aluminum plus another tri-alkyl aluminum such as tri(i-butyl) aluminum or tri-n-octyl aluminum.

"fluorinated aryl borate or fluorinated aryl borane" as used in the present description means: a borate compound having three or four fluorinated (preferably perfluorinated) aryl ligands or a borane compound having three fluorinated (preferably perfluorinated) aryl ligands.

"halide" as used in the present description means: an ion selected from the group of: fluoride ($F^-$), chloride ($Cl^-$), bromide ($Br^-$) or iodide ($I^-$).

"halogen" as used in the present description means: an atom selected from the group of: fluorine (F), chlorine (Cl), bromine (Br) or iodine (I).

"heteroatom" as used in the present description means: an atom other than carbon or hydrogen. Heteroatom also includes halides.

"heteroatom selected from Group 14, 15, 16 or 17 of the IUPAC Periodic Table of the Elements" as used in the present description means: a hetero atom selected from Si, Ge, Sn [Group 14], N, P, As, Sb, Bi [Group 15], O, S, Se, Te [Group 16], F, Cl, Br, I [Group 17].

"alkyl" as used in the present description means: a group consisting of carbon and hydrogen atoms having only single carbon-carbon bonds. An alkyl group may be straight or branched, un-substituted or substituted. It may contain aryl substituents. It may or may not contain one or more heteroatoms, such as oxygen (O), nitrogen (N), phosphorus (P), silicon (Si), tin (Sn) or sulfur (S) or halogen (i.e. F, Cl, Br, I).

"aryl" as used in the present description means: a substituent derived from an aromatic ring. An aryl group may or may not contain one or more heteroatoms, such as oxygen (O), nitrogen (N), phosphorus (P), silicon (Si), tin (Sn), sulfur (S) or halogen (i.e. F, Cl, Br, I). An aryl group also encloses substituted aryl groups wherein one or more hydrogen atoms on the aromatic ring have been replaced by hydrocarbyl groups.

"alkoxide" or "alkoxy" as used in the present description means: a substituent obtained by deprotonation of an aliphatic alcohol. It consists of an alkyl group bonded to an oxygen atom.

"aryloxide" or "aryloxy" or "phenoxide" as used in the present description means: a substituent obtained by deprotonation of an aromatic alcohol. It consists of an aryl group bonded to an oxygen atom.

"silyl group" as used in the present description means: a linear, branched or cyclic substituent containing 1-20 silicon atoms. Said silyl group may comprise Si—Si single or double bonds.

Expressions like for example "C1-C20" and similar formulations may refer to a range regarding a number of carbon atoms, here for example from 1 to 20 carbon atoms.

SHORT DESCRIPTION OF THE DRAWING

FIG. 1 is a drawing of the structures of the oxidizing agents.

DETAILED DESCRIPTION OF THE INVENTION

The present invention relates to the novel and inventive process for the preparation of block copolymers having a first polyolefin block and at least one second polymer block and the products obtained therefrom.

The aim of the present invention is that a process is provided for the production of block copolymers having finely tuned parameters, such as polarity.

The process according to the present invention comprises at least three process steps, viz. steps A), B) and C).

Step A) is related to polymerizing at least one type of olefin monomer using a catalyst system to obtain a first polyolefin block containing a main group metal on at least one chain end. In other words, a first polyolefin block chain-end-functionalized main group metal is obtained in step A). Said main group metal is derived from the at least one type of chain transfer agent. The growing polymer chain resides at least partially on the main group metal center of the chain transfer agent.

This is considered to be the main product of step A), this is an intermediate product in the process according to the present invention. The growing polymer chain residing on the main group metal center of the chain transfer agent is attached on at least one of its sides to a main group metal.

The catalyst system used in step A) comprises: i) a Group 3-10, preferably Group 3-8, metal catalyst or metal catalyst precursor; ii) at least one type of chain transfer agents; iii) optionally a co-catalyst.

Step B) relates to reacting the intermediate product obtained in step A) with at least one type of oxidizing agent to obtain a main group metal-functionalized oxidized first polyolefin block, being a first polyolefin block having at least one oxidized chain end attached to a main group metal function and subsequently with at least one metal substituting agent to remove the main group metal function and obtain an oxidized first polyolefin block having at least one functionalized chain end. During step B) the grown polymer chain attached to the main group metal is oxidized at the position where it is attached to said metal and subsequently, the main group metal is replaced by a non-metal atom or group that can act as an initiator group in step C). Non-limiting examples of non-metallic, proton containing initiator groups are —OH, —SH, —NRH, —NH$_2$. More examples of functional groups are presented below.

Step C) relates to forming at least one second polymer block attached to the oxidized first polyolefin block obtained in step B). Said oxidized first polyolefin block of step B) consists of a polyolefin containing a functional group on at least one chain end in order to obtain the block copolymer. When both ends are oxidized a triblock copolymer is obtained and when one of the chain ends are oxidized, a diblock copolymer is obtained.

There are several synthetic routes according to the present invention in which the second polymer block may be formed during step C). It may for example be grown via ROP or it may be added via transesterification.

In an embodiment, step C) relates to obtaining a block copolymer and is carried out by ring opening polymerization (ROP) using at least one type of cyclic monomer, wherein as an initiator at least one oxidized chain end of the first polyolefin block obtained in step B) is used. More details about ROP are provided below.

In an embodiment, step C) relates to obtaining a block copolymer and is carried out by a transesterification reaction, for example especially a transesterification, at a carbonyl group-containing functionality, for example especially a carboxylic or carbonic acid ester functionality, of at least one second polymer wherein as an initiator at least one oxidized chain end of the first polyolefin block obtained in step B) is used. More details about transesterification are provided below.

In an embodiment, step C) relates to obtaining a block copolymer and is carried out by a combination of ROP and transesterification, wherein as an initiator at least one oxidized chain end of the first polyolefin block obtained in step B) is used.

Preferably, the process steps A), B), and C) are carried out in a series of reactors.

Each of these steps will be discussed in more detail below and embodiments are discussed below.

Step A): Preparation of First Polyolefin Block

The first step in the process according to the present invention is the preparation of a polyolefin that has a reactive electrophilic metal end group. During the polymerization reaction a chain transfer agent, more precisely a main group metal hydrocarbyl or main group metal hydride chain transfer agent (being a main group metal atom bearing one or more hydrocarbyl and/or hydride groups) is used. The product obtained in step A) is then a first polyolefin block that is functionalized on at least one of its ends with a main group metal.

Since the present method is related to the preparation of a block copolymer, at least a second polymer block is to be formed and that is why the polyolefin obtained in step A) is denoted as a "first polyolefin block".

From the prior art chain transfer reactions are known using several different chain transfer agents and using several catalyst systems.

The requirements for this chain transfer polymerization are the presence of i) at least one type of olefin, ii) at least one type of chain transfer agent; iii) at least one type of metal catalyst or metal catalyst precursor. Each of these will be discussed separately below.

Olefins Suitable for Use in Step A)

Examples of suitable monomers include straight-chain or branched α-olefins. Said olefins preferably have between 2 and 30 carbon atoms, more preferably between 2 and 20 carbon atoms. A non-limiting list of examples of olefins is provided above. Preferably, one or more of the following are used: ethylene, propylene, 1-butene, 4-methyl-1-pentene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-cyclopentene, cyclohexene, norbornene, ethylidene-norbornene, and vinylidene-norbornene and one or more combinations thereof. In addition, a combination of ethylene and/or propylene on the one and one or more other olefins on the other hand is also possible. Substituted analogues of the monomers discussed above may also be used, e.g. substituted by one or more halogens. Also aromatic monomers can be used according to the present invention. It is also possible to use a combination of two or more olefins, such as a combination of ethylene with α-olefins to arrive at an LLDPE-block.

Chain Transfer Agent Suitable for Use in Step A)

From the prior art chain transfer reactions are known using several different chain transfer agents.

Chain transfer to aluminum alkyls, zinc alkyls, and boron alkyls and boron hydrides as such has been reported. The present invention uses main group metal hydrocarbyls and/or main group metal hydrides as chain transfer agents.

As non-limiting examples of a main group metal hydrocarbyl or main group metal hydride the following can be used: one or more hydrocarbyl or hydride groups attached to a main group metal selected from aluminum, magnesium, calcium, zinc, gallium or boron. Of these several specific examples are specified below.

The chain transfer agent may be selected from the group specified above having a general structure:

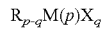

wherein M is a main group metal, R is a hydride or hydrocarbyl group, p is the oxidation state of the metal, X is a heteroatom or heteroatom-bonded ligand, and q is an integer between 0 and p−1. At least one hydrocarbyl or hydride group should be present. Preferably, at least one R group is alkyl.

When R is an alkyl this group has up to and including 30 carbon atoms, such as up to and including 20 carbon atoms, preferably up to and including 10 carbon atoms, such as methyl, ethyl, propyl, butyl, heptyl, hexyl, septyl, octyl, nonyl or decyl and can be unbranched or branched.

When R is an alkenyl this group has up to and including 30 carbon atoms, such as up to and including 20 carbon atoms, preferably up to and including 10 carbon atoms, such as ethenyl, propenyl, butenyl, heptenyl, hexenyl, septenyl, octenyl, nonenyl or decenyl and can be unbranched or branched.

When R is an alkynyl this group has up to and including 30 carbon atoms, such as up to and including 20 carbon atoms, preferably up to and including 10 carbon atoms, such as vinyl, propynyl, butynyl, heptynyl, hexynyl, septynyl, octynyl, nonynyl or decynyl and can be unbranched or branched.

When R is aryl it can be selected from monocyclic or bicyclic groups or groups having more than two rings. These rings may be fused together or linked by a spacer. The aryl might be substituted on any ring position with a hydrocarbyl or heteroatom-containing group. Examples of aryl moieties include, but are not limited to, chemical structures such as phenyl, 1-naphthyl, 2-naphthyl, dihydronaphthyl, tetrahydronaphthyl, biphenyl, anthryl, phenanthryl, biphenylenyl, acenaphthenyl, acenaphthylenyl, tolyl, xylyl, mesityl, 2-methoxy-phenyl, 2,6-dimethoxy-phenyl, 2-N,N-dimethyl-aminomethyl-phenyl, 2-N,N-dimethylamino-phenyl.

When R is an aryl-substituted alkyl this group consists of an alkyl containing an aryl that might be substituted on any ring position with a hydrocarbyl. Non-limiting examples are: benzyl, 1-phenylethyl, 2-phenylethyl, diphenylmethyl, 3-phenylpropyl, and 2-phenylpropyl, o-methoxy-phenyl-methyl, o-N,N-dimethylamino-phenyl-methyl.

In an embodiment main group metal hydrocarbyls containing hydrocarbyldiyl groups, e.g. cyclic or oligomeric main group metal hydrocarbyls or alkoxyhydrocarbyl or amidohydrocarbyl groups may be used in order to obtain telechelic first polymer blocks, which can be used to prepare triblock copolymers. Examples of such cyclic or oligomeric chain transfer agents are EtZn[CH$_2$CH(Et)(CH$_2$)$_6$CH(Et)CH$_2$Zn]$_n$Et (n=1, 2, 3, . . . ), iBu$_2$Al(CH$_2$)$_6$OAliBu$_2$, iBu$_2$Al(CH$_2$)$_{20}$OAliBu$_2$, Al[(CH$_2$)$_{20}$OAliBu$_2$]$_3$, iBu$_2$Al(CH$_2$)$_{20}$N(Me)AliBu$_2$, iBu$_2$Al(CH$_2$)$_6$N(Me)AliBu$_2$, Al[(CH$_2$)$_{20}$N(Me)AliBu$_2$]$_3$ as exemplified in Makio et al. J. Am. Chem. SOC. 2013, (135), 8177-8180 and WO 2011/014533.

The heteroatom-containing ligand X can be selected from the group consisting of: halide, oxide (—O—), carboxylate (—O$_2$CR$^{40}$), alkoxide (—OR$^{40}$; i.e. O-alkyl), aryloxide (—OAr), thiolate (—SR$^{40}$), amide (—NR$^{40}$R$^{41}$), phosphide (—PR$^{40}$R$^{41}$), mercaptanate (—SAr), siloxide (—OSiR$^{40}$R$^{41}$R$^{42}$), stannate (—OSnR$^{40}$R$^{41}$R$^{42}$). Wherein R$^{40}$, R$^{41}$, R$^{42}$ are each independently a hydrocarbyl.

In an embodiment, said chain transfer agent may be selected from tri(i-butyl) aluminum, trimethyl aluminum, triethyl aluminum, tri(i-propyl) aluminum (TIBA), tri(n-butyl) aluminum, tri(t-butyl) aluminum, tri(n-hexyl) aluminum, tri(n-octyl) aluminum, di(i-butyl) aluminum hydride (DIBALH), dimethyl aluminum 2,6-di(t-butyl)-4-methyl-phenoxide, diethyl aluminum 2,6-di(t-butyl)-4-methyl-phenoxide, di(i-butyl) aluminum 2,6-di(t-butyl)-4-methyl-phenoxide, i-butyl aluminum-bis(di-trimethylsilyl)amide), n-octyl aluminum-di(pyridine-2-methoxide), bis(n-octadecyl)-i-butyl aluminum, i-butyl aluminum-bis(di(n-pentyl)amide), n-octyl aluminum-bis(2,6-di-t-butylphenoxide), n-octyl aluminum-di-ethyl(1-naphthyl)amide), ethyl aluminum-bis(t-butyldimethylsiloxide), ethyl aluminum-di(bis(trimethylsilyl)amide), ethyl aluminum-bis(2,3,6,7-dibenzo-1-azacycloheptane-amide), n-octyl aluminum-bis(2,3,6,7-dibenzo-1-azacycloheptane-amide), n-octyl-aluminum-bis(dimethyl(t-butyl)siloxide, trimethyl gallium, triethyl gallium, tri(i-butyl) gallium, di-n-butyl magnesium (DBM), dimethyl magnesium, butyl-octyl-magnesium, butyl-ethyl-magnesium, butyl magnesium 2,6-di(t-butyl)-4-methyl-phenoxide, benzyl calcium 2,6-di(t-butyl)-4-methyl-phenoxide, diethyl zinc, dimethyl zinc, di(i-propyl) zinc, di-t-butyl zinc, di-(n-hexyl) zinc, ethyl zinc (t-butoxide), methyl zinc 2,6-di(t-butyl)-4-methyl-phenoxide, ethyl zinc 2,6-di(t-butyl)-4-methyl-phenoxide, trimethyl boron, trimethyl boron, tributyl boron, diethyl boron 2,6-di(t-butyl)-4-methyl-phenoxide, 9-borabicyclo(3.3.1)nonane, catecholborane, diborane.

Using a chain transfer agent undergoing reversible transfer reactions or a chain shuttling agent can lead to a living-like polymerization. For example hydrocarbyl zinc can be used as a reversible chain transfer agent and/or chain shuttling agent together with another main group metal hydrocarbyl chain transfer agent. An example of the later could be using a combination of for example zinc hydrocarbyl and an aluminum hydrocarbyl as the chain transfer agents, a ternary system (TM+Al+Zn, where TM is transition metal of the catalyst) is formed. Doing so can lead to reversible transfer reactions.

Alternatively hydrocarbyl aluminum, hydrocarbyl gallium, hydrocarbyl boron or hydrocarbyl calcium can be used instead of hydrocarbyl zinc.

In an embodiment, the chain transfer agent is selected from the group consisting of TIBA, DIBALH, DBM and DEZ.

Catalyst system suitable for use in step A)

A catalyst system for use in step a) comprises the following components:
  i) a metal catalyst or metal catalyst precursor comprising a metal from Group 3-10 of the IUPAC Periodic Table of elements; and
  ii) at least one type of chain transfer agent; and
  iii) optionally a co-catalyst;

Suitable chain transfer agents have been discussed above. Suitable metal catalyst and/or metal catalyst precursors are discussed in this section as well as suitable co-catalysts, which are optional. When during step A) a metal catalyst is used, the co-catalyst is optional. When during step A) a metal catalyst precursor is used, a co-catalyst is required to obtain an active metal catalyst.

Metal Catalyst or Metal Catalyst Precursor Suitable for Step A)

A catalyst system for use in step a) comprises the following components:
i) a metal catalyst or metal catalyst precursor comprising a metal from Group 3-10 of the IUPAC Periodic Table of elements; and
ii) optionally a co-catalyst;
iii) optionally a scavenger.

Suitable metal catalysts and/or metal catalyst precursors are discussed in this section as well as suitable co-catalysts, which are optional. A metal catalyst for step A) can be used without co-catalyst, a metal catalyst precursor for step A) requires a co-catalyst to obtain the actual active catalyst.

Metal Catalyst and/or Catalyst Precursor Suitable for Step A)

In the section below several examples for metal catalysts or metal catalyst precursors, which may be used to prepare the metal catalyst according to the present invention, are specified. Metal catalysts that are suitable for use in step A) of the present invention may be obtained by reacting the metal catalyst precursors with a co-catalyst either prior to use in step A) or by in situ reaction with a co-catalyst.

According to the present invention, the metal catalyst has a metal center selected from a Group 3 metal, a Group 4 metal, a Group 5 metal, a Group 6 metal, a Group 7 metal, a Group 8 metal, a Group 9 metal or a Group 10 metal, preferably Y, Ti, Zr, Hf, V, Cr, Fe, Co, Ni, Pd.

The metal catalysts or metal catalyst precursors may for example be a $C_s$-, $C_1$- or $C_2$-symmetric zirconium or hafnium metallocene, preferably an indenyl substituted zirconium or hafnium dihalide, more preferably a bridged bis-indenyl zirconium or hafnium dihalide, even more preferably rac-dimethylsilyl bis-indenyl zirconium or hafnium dichloride (rac-Me$_2$Si(Ind)$_2$ZrCl$_2$ and rac-Me$_2$Si(Ind)$_2$HfCl$_2$, respectively), or rac-dimethylsilyl bis-(2-methyl-4-phenyl-indenyl) zirconium or hafnium dichloride (rac-Me$_2$Si(2-Me-4-Ph-Ind)$_2$ZrCl$_2$ and rac-Me$_2$Si(2-Me-4-Ph-Ind)$_2$HfCl$_2$, respectively).

According to the invention, said catalyst precursor can be for example a so-called half-metallocene, or constrained geometry catalyst, even more preferably, C$_5$Me$_5$[(C$_6$H$_{11}$)$_3$P=N]TiCl$_2$, [Me$_2$Si(C$_5$Me$_4$)N(tBu)]TiCl$_2$, [C$_5$Me$_4$(CH$_2$CH$_2$NMe$_2$)]TiCl$_2$. According to the invention, said catalyst can be for example a so-called post-metallocene, preferably [Et$_2$NC(N(2,6-iPr$_2$—C$_6$H$_3$)]TiCl$_3$ or [N-(2,6-di (1-methylethyl)phenyl)amido)(2-isopropylphenyl)(α-naphthalen-2-diyl(6-pyridin-2-diyl)methane)]hafnium dimethyl.

The metal catalyst or metal catalyst precursor can also be for example a preferably $C_s$ or $C_1$ symmetric compound according to the formula (C$_5$R$^8_4$)R$^9$(C$_{13}$R$^8_8$)ML$^1_n$, where C$_5$R$^8_4$ is an unsubstituted or substituted cyclopentadienyl, and C$_{13}$R$^{11}_8$ is an unsubstituted fluorenyl group or a substituted fluorenyl group; and the bridging R$^9$ group is selected from the group consisting of —Si(Me)$_2$-, —Si(Ph)$_2$-, —C(Me)$_2$- or —C(Ph)$_2$-, thus producing $C_1$- and $C_s$-symmetric metallocenes.

Non-limiting examples of zirconocene dichloride metal catalyst precursors suitable for use in the present invention include: bis(cyclopentadienyl) zirconium dichloride, bis (methyl-cyclopentadienyl) zirconium dichloride, bis(n-propyl-cyclopentadienyl) zirconium dichloride, bis(n-butyl-cyclopentadienyl) zirconium dichloride, bis(1,3-dimethyl-cyclopentadienyl) zirconium dichloride, bis(1,3-di-t-butyl-cyclopentadienyl) zirconium dichloride, bis(1,3-ditrimethylsilyl-cyclopentadienyl) zirconium dichloride, bis (1,2,4-trimethyl-cyclopentadienyl) zirconium dichloride, bis (1,2,3,4-tetramethylcyclopentadienyl) zirconium dichloride, bis(pentamethylcyclopentadienyl) zirconium dichloride, bis (indenyl) zirconium dichloride, bis(2-phenyl-indenyl) zirconium dichloride, bis(fluorenyl) zirconium dichloride, bis (tetrahydrofluorenyl) zirconium dichloride, dimethylsilyl-bis(cyclopentadienyl) zirconium dichloride, dimethylsilyl-bis(3-t-butyl-cyclopentadienyl) zirconium dichloride, dimethylsilyl-bis(3-trimethylsilyl-cyclopentadienyl) zirconium dichloride, dimethylsilyl-bis(tetrahydrofluorenyl) zirconium dichloride, dimethylsilyl-(1-indenyl)(cyclopentadienyl) zirconium dichloride, dimethylsilyl-(1-indenyl)(fluorenyl) zirconium dichloride, dimethylsilyl-(1-indenyl)(octahydrofluorenyl) zirconium dichloride, rac-dimethylsilyl-bis(2-methyl-3-t-butyl-cyclopentadienyl) zirconium dichloride, rac-dimethylsilyl-bis(1-indenyl) zirconium dichloride, rac-dimethylsilyl-bis(4,5,6,7-tetrahydro-1-indenyl) zirconium dichloride, rac-dimethylsilyl-bis(2-methyl-1-indenyl) zirconium dichloride, rac-dimethylsilyl-bis(4-phenyl-1-indenyl) zirconium dichloride, rac-dimethylsilyl-bis(2-methyl-4-phenyl-1-indenyl) zirconium dichloride, rac-ethylene-bis(1-indenyl) zirconium dichloride, rac-ethylene-bis(4,5,6,7-tetrahydro-1-indenyl) zirconium dichloride, rac-1,1,2,2-tetramethylsilanylene-bis(1-indenyl) zirconium dichloride, rac-1,1,2,2-tetramethylsilanylene-bis(4,5,6,7-tetrahydro-1-indenyl) zirconium dichloride, rac-ethylidene(1-indenyl)(2,3,4,5-tetramethyl-1-cyclopentadienyl) zirconium dichloride, rac-[1-(9-fluorenyl)-2-(2-methylbenzo[b]indeno[4,5-d]thiophen-1-yl)ethane]zirconium dichloride, dimethylsilyl bis (cyclopenta-phenanthren-3-ylidene) zirconium dichloride, dimethylsilyl bis(cyclopenta-phenanthren-1-ylidene) zirconium dichloride, dimethylsilyl bis(2-methyl-cyclopenta-phenanthren-1-ylidene) zirconium dichloride, dimethylsilyl bis(2-methyl-3-benz-inden-3-ylidene) zirconium dichloride, dimethylsilyl-bis[(3a,4,5,6,6a)-2,5-dimethyl-3-(2-methyl-phenyl)-6H-cyclopentathien-6-ylidene]zirconium dichloride, dimethylsilyl-(2,5-dimethyl-1-phenylcyclopenta[b]pyrrol-4(1H)-ylidene)(2-methyl-4-phenyl-1-indenyl) zirconium dichloride, bis(2-methyl-1-cyclopenta-phenanthren-1-yl)zirconium dichloride, [ortho-bis(4-phenyl-2-indenyl) benzene]zirconium dichloride, [ortho-bis(5-phenyl-2-indenyl) benzene] zirconium dichloride, [ortho-bis(2-indenyl)benzene] zirconium dichloride, [ortho-bis (1-methyl-2-indenyl)benzene] zirconium dichloride, [2,2'-(1,2-phenyldiyl)-1,1'dimethylsilyl-bis(indenyl)] zirconium dichloride, [2,2'-(1,2-phenyldiyl)-1,1'-(1,2-ethanediyl)-bis (indenyl)] zirconium dichloride, dimethylsilyl-(cyclopentadienyl)(9-fluorenyl) zirconium dichloride, diphenylsilyl-(cyclopentadienyl)(fluorenyl) zirconium dichloride, dimethylmethylene-(cyclopentadienyl)(fluorenyl) zirconium dichloride, diphenylmethylene-(cyclopentadienyl)(fluorenyl) zirconium dichloride, dimethylmethylene-(cyclopentadienyl)(octahydrofluorenyl) zirconium dichloride, diphenylmethylene-(cyclopentadienyl)(octahydrofluorenyl) zirconium dichloride, dimethylmethylene-(cyclopentadienyl)(2,7-di-t-butyl-fluorenyl) zirconium dichloride, diphenylmethylene-(cyclopentadienyl)(2,7-di-t-butyl-fluorenyl) zirconium dichloride, dimethylmethylene-(3-methyl-1-cyclopentadienyl)(fluorenyl) zirconium dichloride, diphenylmethylene-(3-methyl-1-cyclopentadienyl)(fluorenyl) zirconium dichloride, dimethylmethylene-(3-cyclohexyl-1-cyclopentadienyl)(fluorenyl) zirconium dichloride, diphenylmethylene-(3-cyclohexyl-1-cyclopentadienyl) (fluorenyl) zirconium dichloride, dimethylmethylene-(3-t-butyl-1-cyclopentadienyl)(fluorenyl) zirconium dichloride, diphenylmethylene-(3-t-butyl-1-cyclopentadienyl)(fluorenyl) zirconium dichloride, dimethylmethylene-(3-ademantyl-1-cyclopentadienyl)(fluorenyl) zirconium dichloride, diphenylmethylene-(3-ademantyl-1-cyclopentadienyl)(fluorenyl) zirconium dichloride, dimethylmethylene-(3-methyl-1-cyclopentadienyl)(2,7-di-t-butyl-fluorenyl) zirconium dichloride, diphenylmethylene-(3-methyl-1-cyclopentadienyl)(2,7-di-t-butyl-fluorenyl) zirconium dichloride, dimethylmethylene-(3-cyclohexyl-1-cyclopentadienyl)(2,7-di-t-butyl-fluorenyl) zirconium dichloride, diphenylmethylene-(3-cyclohexyl-1-cyclopentadienyl)(2,7-di-t-butyl-fluorenyl) zirconium dichloride, dimethylmethylene-(3-t-butyl-1-cyclopentadienyl)(2,7-di-t-butyl-fluorenyl) zirconium dichloride, diphenylmethylene-(3-t-butyl-1-cyclopentadienyl)(2,7-di-t-butyl-fluorenyl) zirconium dichloride, dimethylmethylene-(3-methyl-cyclopentadienyl)(octahydro-octamethyl-dibenzo-fluorenyl) zirconium dichloride, diphenylmethylene-(3-methyl-cyclopentadienyl)(octahydro-octamethyl-dibenzo-fluorenyl) zirconium dichloride, dimethylmethylene-(3-cyclohexyl-cyclopentadienyl)(octahydro-octamethyl-dibenzo-fluorenyl) zirconium dichloride, diphenylmethylene-(3-cyclohexyl-cyclopentadienyl)(octahydro-octamethyl-dibenzo-fluorenyl) zirconium dichloride, dimethylmethylene-(3-t-butyl-cyclopentadienyl)(octahydro-octamethyl-dibenzo-fluorenyl) zirconium dichloride, diphenylmethylene-(3-t-butyl-cyclopentadienyl)(octahydro-octamethyl-dibenzo-fluorenyl) zirconium dichloride, dimethylmethylene-(3-ademantyl-cyclopentadienyl)(octahydro-octamethyl-dibenzo-fluorenyl) zirconium dichloride, diphenylmethylene-(3-ademantyl-cyclopentadienyl)(octahydro-octamethyl-dibenzo-fluorenyl) zirconium dichloride.

In a preferred embodiment, the metal catalyst or metal catalyst precursor can be for example: [[2,2'-[[[2-(dimethylamino-κN)ethyl]imino-κN]bis(methylene)]bis[4,6-bis(1,1-dimethylethyl) phenolato-κO]] zirconium dibenzyl, (phenylmethyl)[[2,2'-[(propylimino-κN)bis(methylene)]bis[4,6-bis(1,1-dimethylethyl)phenolato-κO]] zirconium dibenzyl or (phenylmethyl)[[2,2'-[[[(2-pyridinyl-κN)methyl]imino-κN]bis(methylene)]bis[4,6-bis(1,1-dimethylethyl)phenolato-κO]] zirconium dibenzyl.

In a preferred embodiment, complexes as reported in WO 00/43426, WO 2004/081064, US 2014/0039138 A1, US 2014/0039139 A1 and US 2014/0039140 A1 are suitable to use as metal catalyst precursors for the processes of the present invention.

Compounds analogous to those listed above but where Zr has been replaced by Hf, so called hafnocenes, may also be used according to the as catalyst precursors present invention.

The metal catalysts or metal catalyst precursors for use in the present invention may also be from post-metallocene catalysts or catalyst precursors.

In a preferred embodiment, the metal catalyst or metal catalyst precursor may be: [HN(CH2CH2N-2,4,6-Me3-C6H2)2]Hf(CH2Ph)2 or bis[N,N'-(2,4,6-trimethylphenyl)amido)ethylenediamine]hafnium dibenzyl.

In a another preferred embodiment, the metal catalyst or metal catalyst precursor may be 2,6-diisopropylphenyl-N-(2-methyl-3-(octylimino)butan-2) hafnium trimethyl, 2,4,6-trimethylphenyl-N-(2-methyl-3-(octylimino)butan-2) hafnium trimethyl.

In a preferred embodiment, the metal catalyst or metal catalyst precursor may be [2,6-iPr2C6H3NC(2-iPr-C6H4)-2-(6-C5H6)]HfMe2 [N-(2,6-di(1-methylethyl)phenyl)amido)(2-isopropylphenyl) (□-naphthalen-2-diyl(6-pyridin-2-diyl)methane)]hafnium dimethyl.

Other non-limiting examples of metal catalyst precursors according to the present invention are: [N-(2,6-di(1-methylethyl)phenyl)amido)(o-tolyl)(α-naphthalen-2-diyl(6-pyridin-2-diyl)methane)] hafnium dimethyl, [N-(2,6-di(1-methylethyl)phenyl)amido)(o-tolyl)(α,α-naphthalen-2-diyl(6-pyridin-2-diyl)methane)] hafnium di(N,N-dimethylamido), [N-(2,6-di(1-methylethyl)phenyl)amido)(o-tolyl)(α,α-naphthalen-2-diyl(6-pyridin-2-diyl)methane)] hafnium dichloride, [N-(2,6-di(1-methylethyl)phenyl)amido)(phenanthren-5-yl)(α,α-naphthalen-2-diyl (6-pyridin-2-diyl)methane)] hafnium dimethyl, [N-(2,6-di(1-methylethyl)phenyl)amido)(phenanthren-5-yl)(α-naphthalen-2-diyl(6-pyridin 2-diyl)methane)] hafnium di(N,N-dimethylamido), [N-(2,6-di(I-methylethyl)phenyl)amido)(phenanthren-5-yl) (α-naphthalen-2-diyl(6-pyridin-2-diyl)methane)] hafnium dichloride. Other non-limiting examples include the family of pyridyl diamide metal dichloride complexes such as: [N-[2,6-bis(1-methylethyl)phenyl]-6-[2-[phenyl(phenylamino-κN)methyl]phenyl]-2-pyridinemethanaminato(2-)-κN1,κN2]hafnium dichloride, [N-[2,6-bis(1-methylethyl)phenyl]-6-[2-[(phenylamino-κN)methyl]-1-naphthalenyl]-2-pyridinemethanaminato(2-)-κN1,κN2] hafnium dichloride, [N-[2,6-bis(1-methylethyl)phenyl]-α-[2-(1-methylethyl)phenyl]-6-[2-[(phenylamino-κN)methyl]phenyl]-2-pyridinemethanaminato(2-)-κN1,κN2] hafnium dichloride, [N-(2,6-diethylphenyl)-6-[2-[phenyl(phenylamino-κN)methyl]-1-naphthalenyl]-2-pyridinemethanaminato(2-)-κN1,κN2]zirconium dichloride, [4-methyl-2-[[2-phenyl-1-(2-pyridinyl-κN)ethyl]amino-κN]phenolato(2-)-κO]bis(phenylmethyl)hafnium bis(phenylmethyl), [2-(1,1-dimethylethyl)-4-methyl-6-[[2-phenyl-1-(2-pyridinyl-κN)ethyl]amino-κN]phenolato(2-)-κO] hafnium bis(phenylmethyl), [2-(1,1-dimethylethyl)-4-methyl-6-phenyl(2-pyridinyl-κN)methyl]amino-κN]phenolato(2-)-κO] hafnium bis(phenylmethyl).

Non-limiting examples of titanium dichloride metal catalyst precursors suitable for use in the present invention include: cyclopentadienyl(P,P,P-tri-t-butylphosphine imidato) titanium dichloride, pentafluorophenylcyclopentadienyl(P,P,P-tri-t-butylphosphine imidato) titanium dichloride, pentamethylcyclopentadienyl(P,P,P-tri-t-butylphosphine imidato) titanium dichloride, 1,2,3,4-tetraphenyl-cyclopentadienyl(P,P,P-tri-t-butylphosphine imidato) titanium dichloride, cyclopentadienyl(P,P,P-tricyclohexylphosphine imidato) titanium dichloride, pentafluorophenyl cyclopentadienyl(P,P,P-tricyclohexylphosphine imidato) titanium dichloride, pentamethylcyclopentadienyl(P,P,P-tricyclohexylphosphine imidato) titanium dichloride, 1,2,3,4-tetraphenyl-cyclopentadienyl(P,P,P-tricyclohexylphosphine imidato) titanium dichloride, pentamethylcyclopentadienyl (P,P-dicyclohexyl-P-(phenylmethyl)phosphine imidato) titanium dichloride, cyclopentadienyl(2,6-di-t-butyl-4-methyl-phenoxy) titanium dichloride, pentafluorophenylcyclopentadienyl(2,6-di-t-butyl-4-methylphenoxy) titanium dichloride, pentamethylcyclopentadienyl(2,6-di-t-butyl-4-methylphenoxy) titanium dichloride, 1,2,3-trimethyl-cyclopentadienyl(2,6-bis(1-methylethyl) phenolato) titanium dichloride, [(3a,4,5,6,6a-η)-2,3,4,5,6-pentamethyl-3aH-cyclopenta[b]thien-3a-yl](2,6-bis(1-methylethyl)phenolato) titanium dichloride, pentamethylcyclopentadienyl(N,N'-bis(1-methylethyl)ethanimidamidato) titanium dichloride, pentamethylcyclopentadienyl(N,N'-dicyclohexylbenzenecarboximidamidato) titanium dichloride, pentamethylcyclopentadienyl(N,N'-bis(1-methylethyl)benzenecarboximidamidato) titanium dichloride, cyclopentadienyl(1,3-bis(1,1-dimethylethyl)-2-imidazolidiniminato) titanium dichloride, cyclopentadienyl (1,3-dicyclohexyl-2-imidazolidiniminato) titanium dichloride, cyclopentadienyl(1,3-bis[2,6-bis(1-methylethyl)phenyl]-2-imidazolidiniminato) titanium dichloride, pentafluorophenylcyclopentadienyl(1,3-bis(1,1-dimethylethyl)-2-imidazolidiniminato) titanium dichloride, pentafluorophenylcyclopentadienyl(1,3-dicyclohexyl-2-imidazolidiniminato) titanium dichloride, pentafluorophenylcyclopentadienyl(1,3-bis[2,6-bis(1-methylethyl)phenyl]-2-imidazolidiniminato) titanium dichloride, pentamethylcyclopentadienyl(di-t-butylketimino) titanium dichloride, pentamethylcyclopentadienyl(2,2,4,4-tetramethyl-3-pentaniminato) titanium dichloride, [(3a,4,5,6,6a-η)-2,4,5,6-tetramethyl-3aH-cyclopenta[b]thien-3a-yl](2,2,4,4-tetramethyl-3-pentaniminato) titanium dichloride, cyclopentadienyl(N,N-bis(1-methylethyl)benzenecarboximidamidato) titanium dichloride, pentafluorophenylcyclopentadienyl(N,N-bis(1-methylethyl)benzenecarboximidamidato) titanium dichloride, pentamethylcyclopentadienyl(N,N-bis(1-methylethyl)benzenecarboximidamidato) titanium dichloride, cyclopentadienyl(2,6-difluoro-N,N-bis(1-methylethyl)benzenecarboximidamidato) titanium dichloride, pentafluorophenylcyclopentadienyl(2,6-difluoro-N,N-bis(1-methylethyl)benzenecarboximidamidato) titanium dichloride, pentamethylcyclopentadienyl(2,6-difluoro-N,N-bis(1-methylethyl)benzenecarboximidamidato) titanium dichloride, cyclopentadienyl(N,N-dicyclohexyl-2,6-difluorobenzenecarboximidamidato) titanium dichloride, pentafluorophenylcyclopentadienyl(N,N-dicyclohexyl-2,6-difluorobenzenecarboximidamidato) titanium dichloride, pentamethylcyclopentadienyl(N,N-dicyclohexyl-2,6-difluorobenzenecarboximidamidato) titanium dichloride, cyclopentadienyl(N,N,N',N'-tetramethylguanidinato) titanium dichloride, pentafluorophenylcyclopentadienyl(N,N,N',N'-tetramethylguanidinato) titanium dichloride, pentamethylcyclopentadienyl(N,N,N',N'-tetramethylguanidinato) titanium dichloride, pentamethylcyclopentadienyl(1-(imino)phenylmethyl)piperidinato) titanium dichloride, pentamethylcyclopentadienyl chromium dichloride tetrahydrofuran complex.

Non-limiting examples of titanium (IV) dichloride metal catalyst suitable for use in the present invention are: (N-t-butylamido)(dimethyl)(tetramethylcyclopentadienyl)silane titanium dichloride, (N phenylamido)(dimethyl)(tetramethylcyclopentadienyl) silane titanium dichloride, (N sec-butylamido)(dimethyl)(tetramethylcyclopentadienyl)silane titanium dichloride, (N sec-dodecylamido) (dimethyl)(fluorenyl)silane titanium dichloride, (3 phenylcyclopentadien-1-yl) dimethyl(t-butylamido) silane titanium dichloride, (3 (pyrrol-1-yl)cyclopentadien-1-yl) dimethyl(t-butylamido)silane titanium dichloride, (3,4-diphenylcyclopentadien-1-yl)dimethyl(t-butylamido) silane titanium dichloride, 3 (3-N,N-dimethylamino)phenyl) cyclopentadien-1-yl)dimethyl(t-butylamido) silane titanium dichloride, (P-t-butylphospho)(dimethyl) (tetramethylcyclopentadienyl) silane titanium dichloride. Other examples are the metal catalyst precursor cited in the list directly above wherein Ln is dimethyl, dibenzyl, diphenyl, 1,4-diphenyl-2-butene-1,4-diyl, 1,4-dimethyl-2-butene-1,4-diyl or 2,3-dimethyl-2-butene-1,4-diyl.

Suitable metal catalyst precursors can be also the trivalent transition metal as those described in WO 9319104 (for example see especially example 1, page 13, line 15).

Suitable metal catalyst precursors can be also the trivalent transition metal as [C5Me4CH2CH2N(n-Bu)2]TiCl2 described in WO 9613529 (for example see especially example III, page 20, line 10-13) or [C5H(iPr)3CH2CH2NMe2]TiCl2 described in WO 97142232 and WO 9742236 (for example see especially example 1, page 26, line 14).

In an embodiment, the metal catalyst precursor is [C5H4CH2CH2NMe2]TiCl2;

In an embodiment, the metal catalyst or metal catalyst precursor may also be [C5Me4CH2CH2NMe2]TiCl2, [C5H4CH2CH2NiPr2]TiCl2, [C5Me4CH2CH2NiPr2]TiCl2, [C5H4C9H6N]TiCl2, [C5H4CH2CH2NMe2]CrCl2, [C5Me4CH2CH2NMe2]CrCl2; [C5H4CH2CH2NiPr2]CrCl2, [C5Me4CH2CH2NiPr2]CrCl2 or [C5H4C9H6N]CrCl2.

A non-limiting list of examples of metal catalyst precursors that would be suitable according to the present invention are: (N,N dimethylamino)methyl-tetramethylcyclopentadienyl titanium dichloride, (N,N dimethylamino)ethyl-tetramethylcyclopentadienyl titanium dichloride, (N,N dimethylamino)propyl-tetramethylcyclopentadienyl titanium dichloride, (N,N dibutylamino)ethyl-tetramethylcyclopentadienyl titanium dichloride, (pyrrolidinyl)ethyl-tetramethylcyclopentadienyl titanium dichloride, (N,N-dimethylamino)ethyl-fluorenyl titanium dichloride, (bis(1-methyl-ethyl)phosphino)ethyl-tetramethylcyclopentadienyl titanium dichloride, (bis(2-methyl-propyl)phosphino)ethyl-tetramethylcyclopentadienyl titanium dichloride, (diphenylphosphino)ethyl-tetramethylcyclopentadienyl titanium dichloride, (diphenylphosphino)methyldimethylsilyl-tetramethylcyclopentadienyl titanium dichloride. Other examples are the catalysts cited in the list directly above wherein Ln wherein the chloride can be replaced with bromide, hydride, methyl, benzyl, phenyl, allyl, (2-N,N-dimethylaminomethyl)phenyl, (2-N,N-dimethylamino)benzyl, 2,6-dimethoxyphenyl, pentafluorophenyl, and/or wherein the metal is trivalent titanium or trivalent chromium.

In a preferred embodiment, the catalyst precursor is: [2-(2,4,6-iPr3-C6H2)-6-(2,4,6-iPr3-C6H2)-O5H3N]Ti(CH2Ph)3 or [Et2NC(N-2,6-iPr2-C6H3)2]TiCl3

Other non-limiting examples of metal catalyst precursors according to the present invention are: {N',N''-bis[2,6-di(1-methylethyl)phenyl]-N,N-diethylguanidinato} titanium trichloride, {N',N''bis[2,6-di(1-methylethyl)phenyl]-N-methyl-N-cyclohexylguanidinato} titanium trichloride, {N',N''-bis[2,6-di(1-methylethyl)phenyl]-N,N-pentamethyleneguanidinato} titanium trichloride, {N',N''-bis[2,6-di(methyl)phenyl]-sec-butyl-aminidinato} titanium trichloride, {N-trimethylsilyl,N'—(N'',N''-dimethylaminomethyl)benzamidinato} titanium dichloride THF complex, {N-trimethylsilyl, N'—(N'',N''-dimethylaminomethyl)benzamidinato} vanadium dichloride THF complex, {N,N'-bis(trimethylsilyl)benzamidinato} titanium dichloride THF complex, {N,N'-bis(trimethylsilyl)benzamidinato} vanadium dichloride THF complex.

In a preferred embodiment, the catalyst precursor can be for example: [C5H3N{CMe=N(2,6-iPr2C6H3)}2]FeCl2, [2,4-(t-Bu)2,-6-(CH=NC6F5)C6H2O]2TiCl2 or bis[2-(1,1-dimethylethyl)-6-[(pentafluorophenylimino)methyl] phenolato] titanium dichloride. Other non-limiting examples of metal catalyst precursors according to the present invention can be for example: bis[2-[(2-pyridinylimino)methyl]phenolato] titanium dichloride, bis[2-(1,1-dimethylethyl)-6-[(phenylimino)methyl]phenolato] titanium dichloride, bis[2-(1,1-dimethylethyl)-6-[(1-naphthalenylimino)methyl] phenolato] titanium dichloride, bis[3-[(phenylimino)methyl][1,1'-biphenyl]-2-phenolato] titanium dichloride, bis[2-(1,1-dimethylethyl)-4-methoxy-6-[(phenylimino)methyl] phenolato] titanium dichloride, bis[2,4-bis(1-methyl-1-phenylethyl)-6-[(phenylimino)methyl]phenolato] titanium dichloride, bis[2,4-bis(1,1-dimethylpropyl)-6-[(phenylimino)methyl]phenolato] titanium dichloride, bis[3-(1,1- dimethylethyl)-5-[(phenylimino)methyl][1,1'-biphenyl]-4-phenolato] titanium dichloride, bis[2-[(cyclohexylimino)methyl]-6-(1,1-dimethylethyl)phenolato] titanium dichloride, bis[2-(1,1-dimethylethyl)-6-[[[2-(1-methylethyl)phenyl]imino]methyl]phenolato] titanium dichloride, bis[2-(1,1-dimethylethyl)-6-[(pentafluorophenylimino)ethyl]phenolato] titanium dichloride, bis[2-(1,1-dimethylethyl)-6-[(pentafluorophenylimino)propyl]phenolato] titanium dichloride, bis[2,4-bis(1,1-dimethylethyl)-6-[1-(phenylimino)ethyl]phenolato] titanium dichloride, bis[2,4-bis(1,1-dimethylethyl)-6-[1-(phenylimino)propyl]phenolato] titanium dichloride, bis[2,4-bis(1,1-dimethylethyl)-6-[phenyl(phenylimino)methyl]phenolato] titanium dichloride. Other examples are the metal catalyst precursor cited in the list directly above wherein the dichloride can be replaced with dimethyl, dibenzyl, diphenyl, 1,4-diphenyl-2-butene-1,4-diyl, 1,4-dimethyl-2-butene-1,4-diyl or 2,3-dimethyl-2-butene-1,4-diyl; and/or wherein the metal may be zirconium or hafnium.

In a preferred embodiment, the catalyst precursor can be: [2-[[[2-[[[3,5-bis(1,1-dimethylethyl)-2-(hydroxy-κO)phenyl]methyl]amino-κN]ethyl]methylamino-κN]methyl]-4,6-bis(1,1-dimethylethyl)phenolato(2-)-κO] titanium bis(phenylmethyl), [2,4-dichloro-6-[[[2-[[[3,5-dichloro-2-(hydroxy-KO)phenyl]methyl]amino-κN]ethyl]methylamino-κN]methyl]phenolato(2-)-κO] titanium bis(phenylmethyl), [2-[[[[1-[[2-(hydroxy-κO)-3,5-diiodophenyl]methyl]-2-pyrrolidinyl-κN]methyl]amino-κN]methyl]-4-methyl-6-tricyclo[3.3.1.13,7]dec-1-ylphenolato(2+κO] titanium bis(phenylmethyl), [2-[[[2-[[[[2-(hydroxy-κO)-3,5-bis(1-methyl-1-phenylethyl)phenyl]methyl]methylamino-κN]methyl]phenyl]methylamino-κN]methyl]-4,6-bis(1-methyl-1-phenylethyl)phenolato(2-)-κO] titanium bis(phenylmethyl), [2,4-dichloro-6-[[[2-[[[3,5-dichloro-2-(hydroxy-KO)phenyl]methyl]amino-κN]methyl]phenyl]amino-κN]methyl]phenolato(2-)-κO] titanium bis(phenylmethyl). Other examples are the metal catalyst precursor cited in the list directly above wherein bis(phenylmethyl) can be replaced with dichloride, dimethyl, diphenyl, 1,4-diphenyl-2-butene-1,4-diyl, 1,4-dimethyl-2-butene-1,4-diyl or 2,3-dimethyl-2-butene-1,4-diyl; and/or wherein the metal may be zirconium or hafnium.

A non-limiting list of examples of chromium catalysts that would be suitable for use in to the present invention are: (N-t-butylamido)(dimethyl)(tetramethylcyclopentadienyl) silane chromium bis(trimethylsilyl)methyl, (N-phenylamido)(dimethyl)(tetramethylcyclopentadienyl) silane chromium bis(trimethyl)methyl, (N-sec-butylamido)(dimethyl) (tetramethylcyclopentadienyl)silane chromium bis(trimethylsilyl)methyl, (N-sec-dodecylamido)(dimethyl)(fluorenyl)silane chromium hydride triphenylphosphine, (P-t-butylphospho)(dimethyl)(tetramethylcyclopentadienyl) silane chromium bis(trimethylsilyl)methyl. Other examples are the catalysts cited in the list directly above wherein L1 is hydride, methyl, benzyl, phenyl, allyl, (2-N,N-dimethylaminomethyl)phenyl, (2-N,N-dimethylamino)benzyl; in other words chromium methyl, chromium benzyl, chromium allyl, chromium (2-N,N-dimethylamino)benzyl; and/or wherein the metal is trivalent yttrium or samarium; Other examples are metal catalyst precursors as cited in the list directly above wherein Ln is chloride, bromide, hydride, methyl, benzyl, phenyl, allyl, (2-N,N-dimethylaminomethyl)phenyl, (2-N,N-dimethylamino)benzyl and/or wherein the metal is trivalent titanium or trivalent chromium.

Non-limiting examples of metal catalyst precursors according to the present invention are: N,N'-1,2-acenaphthylenediylidenebis(2,6-bis(1-methylethyl)benzenamine) nickel dibromide, N,N'-1,2-ethanediylidenebis(2,6-dimethylbenzenamine) nickel dibromide, N,N'-1,2-ethanediylidenebis(2,6-bis(1-methyl-ethyl)benzenamine) nickel dibromide, N,N'-1,2-acenaphthylenediylidenebis(2,6-dimethylbenzenamine) nickel dibromide, N,N'-1,2-acenaphthylenediylidenebis(2,6-bis(1-methylethyl)benzenamine) nickel dibromide, N,N'-1,2-acenaphthylenediylidenebis(1,1'-biphenyl)-2-amine nickel dibromide. Other examples are the catalysts cited in the list directly above wherein bromide can be replaced with chloride, hydride, methyl, benzyl and/or the metal can be palladium.

Further non-limiting examples of metal catalyst precursors according to the present invention are: [2-[[[2,6-bis(1-methylethyl)phenyl]imino-κN]methyl]-6-(1,1-dimethylethyl)phenolato-κO] nickel phenyl(triphenylphosphine), [2-[[[2,6-bis(1-methylethyl)phenyl]imino-κN]methyl]-6-(1,1-dimethylethyl)phenolato-κO] nickel phenyl(triphenylphosphine), [2-[[[2,6-bis(1-methylethyl)phenyl]imino-κN]methyl]phenolato-κO] nickel phenyl(triphenylphosphine)-, [3-[[[2,6-bis(1-methylethyl)phenyl]imino-κN]methyl][1,1'-biphenyl]-2-olato-κO] nickel phenyl(triphenylphosphine)-, [2-[[[2,6-bis(1-methylethyl)phenyl]imino-κN]methyl]-4-methoxyphenolato-κO] nickel phenyl(triphenylphosphine), [2-[[[2,6-bis(1-methylethyl)phenyl]imino-κN]methyl]-4-nitrophenolato-κO] nickel phenyl(triphenylphosphine), [2,4-diiodo-6-[[[3,3",5,5"-tetrakis(trifluoromethyl)[1,1':3',1"-terphenyl]-2'-yl]imino-κN] methyl]phenolato-κO] nickel methyl[[3,3',3"-(phosphinidyne-κP)tris[benzenesulfonato]]] trisodium; [2,4-diiodo-6-[[[3,3",5,5"-tetrakis(trifluoromethyl)[1,1':3',1"-terphenyl]-2'-yl]imino-κN]methyl]phenolato-κO] nickel methyl[[3,3'-(phenylphosphinidene-κP)bis[benzenesulfonato]]]-disodium.

Co-Catalysts Suitable for Step A)

A co-catalyst can be used when a metal catalyst precursor is applied. The function of this co-catalyst is to activate the metal catalyst precursor. Co-catalysts may be selected for example from the group consisting of MAO, DMAO, MMAO, SMAO, possibly in combination with aluminum alkyls, for example triisobutyl aluminum, and/or with a combination of an aluminum alkyl, for example triisobutyl aluminum, and a fluorinated aryl borane or fluorinated aryl borate (viz. B(R')$_y$ wherein R' is a fluorinated aryl and y is 3 or 4, respectively). Examples of a fluorinated borane is B(C$_6$F$_5$)$_3$ and of fluorinated borates are [X]$^+$[B(C$_6$F$_5$)$_4$]$^-$ (e.g. X=Ph$_3$C, C$_6$H$_5$N(H)Me$_2$).

Methylaluminoxane or MAO as used in the present description may mean: a compound derived from the partial hydrolysis of trimethyl aluminum that serves as a co-catalyst for catalytic olefin polymerization.

Supported methylaluminoxane or SMAO as used in the present description may mean: a methylaluminoxane bound to a solid support.

Depleted methylaluminoxane or DMAO as used in the present description may mean: a methylaluminoxane from which the free trimethyl aluminum has been removed.

Modified methylaluminoxane or MMAO as used in the present description may mean: modified methylaluminoxane, viz. the product obtained after partial hydrolysis of trimethyl aluminum plus another trialkyl aluminum such as tri(isobutyl) aluminum or tri-n-octyl aluminum.

Fluorinated aryl borates or fluorinated aryl boranes as used in the present description may mean: a borate compound having three or four fluorinated (preferably perfluorinated) aryl ligands or a borane compound having three fluorinated (preferably perfluorinated) aryl ligands.

For example, the co-catalyst can be an organometallic compound. The metal of the organometallic compound can be selected from Group 1, 2, 12 or 13 of the IUPAC Periodic Table of Elements. Preferably, the co-catalyst is an organoaluminum compound, more preferably an aluminoxane, said aluminoxane being generated by the reaction of a trialkyl aluminum compound with water to partially hydrolyze said aluminoxane. For example, trimethyl aluminum can react with water (partial hydrolysis) to form methylaluminoxane (MAO). MAO has the general formula $(Al(CH_3)_{3-n}O_{0.5n})_x$—$(AlMe_3)_y$ having an aluminum oxide framework with methyl groups on the aluminum atoms.

MAO generally contains significant quantities of free trimethyl aluminum (TMA), which can be removed by drying the MAO to afford the so-called depleted MAO or DMAO. Supported MAO (SMAO) may also be used and may be generated by the treatment of an inorganic support material, typically silica, by MAO.

Alternatively to drying the MAO, when it is desired to remove the free trimethyl aluminum, a bulky phenol such as butylhydroxytoluene (BHT, 2,6-di-t-butyl-4-methylphenol) can be added which reacts with the free trimethyl aluminum.

Neutral Lewis acid modified polymeric or oligomeric aluminoxanes may also be used, such as alkylaluminoxanes modified by addition of a C1-30 hydrocarbyl substituted Group 13 compound, especially a tri(hydrocarbyl) aluminum- or tri(hydrocarbyl) boron compounds, or a halogenated (including perhalogenated) derivatives thereof, having 1 to 10 carbons in each hydrocarbyl or halogenated hydrocarbyl group, more especially a trialkyl aluminum compound.

Other examples of polymeric or oligomeric aluminoxanes are tri(isobutyl) aluminum- or tri(n-octyl) aluminum-modified methylaluminoxane, generally referred to as modified methylaluminoxane, or MMAO. In the present invention, MAO, DMAO, SMAO and MMAO may all be used as co-catalyst.

In addition, for certain embodiments, the metal catalyst precursors may also be rendered catalytically active by a combination of an alkylating agent and a cation forming agent which together form the co-catalyst, or only a cation forming agent in the case the catalyst precursor is already alkylated, as exemplified in T. J. Marks et al., Chem. Rev. 2000, (100), 1391. Suitable alkylating agents are trialkyl aluminum compounds, preferably TIBA. Suitable cation forming agents for use herein include (i) neutral Lewis acids, such as 01-30 hydrocarbyl substituted Group 13 compounds, preferably tri(hydrocarbyl)boron compounds and halogenated (including perhalogenated) derivatives thereof, having from 1 to 10 carbons in each hydrocarbyl or halogenated hydrocarbyl group, more preferably perfluorinated tri(aryl) boron compounds, and most preferably tris(pentafluorophenyl) borane, (ii) non polymeric, compatible, non-coordinating, ion forming compounds of the type $[C]^+[A]^-$ where "C" is a cationic group such as ammonium, phosphonium, oxonium, silylium or sulfonium groups and $[A]^-$ is an anion, especially for example a borate.

Non-limiting examples of the anionic ["A"] are borate compounds such as C1-30 hydrocarbyl substituted borate compounds, preferably tetra(hydrocarbyl)boron compounds and halogenated (including perhalogenated) derivatives thereof, having from 1 to 10 carbons in each hydrocarbyl or halogenated hydrocarbyl group, more preferably perfluorinated tetra(aryl)boron compounds, and most preferably tetrakis(pentafluorophenyl) borate.

A supported catalyst may also be used, for example using SMAO as the co-catalyst. The support material can be an inorganic material. Suitable supports include solid and particulated high surface area, metal oxides, metalloid oxides, or mixtures thereof. Examples include: talc, silica, alumina, magnesia, titania, zirconia, tin oxide, aluminosilicates, borosilicates, clays, and mixtures thereof.

Preparation of a supported catalyst can be carried out using methods known in the art, for example i) a metal catalyst precursor can be reacted with supported MAO to produce a supported catalyst; ii) MAO can be reacted with a metal catalyst precursor and the resultant mixture can be added to silica to form the supported catalyst; iii) a metal catalyst precursor immobilized on a support can be reacted with soluble MAO.

Scavengers Suitable for Step A)

A scavenger can optionally be added in the catalyst system in order to react with impurities that are present in the polymerization reactor, and/or in the solvent and/or monomer feed. This scavenger prevents poisoning of the catalyst during the olefin polymerization process. The scavenger can be the same as the co-catalyst but can also independently be selected from the group consisting of aluminum hydrocarbyls (e.g. triisobutyl aluminum, trioctyl aluminum, trimethyl aluminum, MAO, MMAO, SMAO), zinc hydrocarbyls (e.g. diethyl zinc) or magnesium hydrocarbyls (e.g. dibutyl magnesium).

Polymerization of the Olefin

Step A) is preferably carried out in an inert atmosphere.

Polymerization of the olefin can for example be carried out in the gas phase below the melting point of the polymer. Polymerization can also be carried out in the slurry phase below the melting point of the polymer. Moreover, polymerization can be carried out in solution at temperatures above the melting point of the polymer product.

It is known to continuously polymerize one or more olefins, such as ethylene or propylene, in solution or in slurry, e.g. in a continuous (multi) CSTR or (multi) loop reactor, in the gas-phase in a reactor with a fluidized or mechanically stirred bed or in a combination of these different reactors, in the presence of a catalyst based on a compound of a transition metal belonging to Groups 3 to 10 of the Periodic Table of the Elements.

For the gas phase process, the polymer particles are kept in the fluidized and/or stirred state in a gaseous reaction mixture containing the olefin(s). The catalyst is introduced continuously or intermittently into the reactor while the polymer constituting the fluidized or mechanically stirred bed is withdrawn from the reactor, also continuously or intermittently. The heat of the polymerization reaction is essentially removed by the gaseous reaction mixture, which passes through heat transfer means before being recycled into the reactor. In addition, a liquid stream may be introduced into the gas-phase reactor to enhance heat removal.

Slurry phase polymerization of olefins is very well known, wherein an olefin monomer and optionally olefin comonomer are polymerized in the presence of a catalyst in a diluent in which the solid polymer product is suspended and transported. Two or more reactors are typically used in such polymerizations when it is desired to produce a multimodal product, in which a polymer made in a first reactor is transferred to a second reactor, where a second polymer having different properties to the first polymer is made in the presence of the first. However it may also be desirable to connect two reactors making monomodal polymers in order to create a swing monomodal/multimodal plant or to increase the flexibility of two small reactors that individually may lack the scale to be economically viable. A slurry reactor may also be combined with a gas phase reactor.

Slurry phase polymerizations are typically carried out at temperatures in the range 50-125° C. and at pressures in the range 1-40 bar. The catalyst used can be any catalyst typically used for olefin polymerization such as those according to the present invention. The product slurry, comprising polymer and diluent and in most cases also components of the catalyst system, olefin monomer and comonomer can be discharged from each reactor intermittently or continuously, optionally using concentrating devices such as hydrocyclones or settling legs to minimize the quantity of fluids withdrawn with the polymer.

The present invention may also be carried out in a solution polymerization process. Typically, in the solution process, the monomer and polymer are dissolved in an inert solvent.

Solution polymerization has some advantages over slurry processes. The molecular weight distribution and the process variables are more easily controlled because the polymerization occurs in a homogeneous phase using homogeneous single-site catalysts. The high polymerization temperature typically above 150° C. also leads to high reaction rates. The solution process is used primarily for the production of relatively low molecular weight and/or low density resins which are difficult to manufacture by the liquid slurry or gas phase processes. The solution process is very well suited to produce low density products but it is thought much less satisfactory for higher molecular weight resins because of the excessive viscosity in the reactor as discussed by Choi and Ray, JMS Review Macromolecular Chemical Physics C25(I), 1-55, pg. 10 (1985).

Unlike in the gas phase or slurry process, in a solution process there is usually no polymer solid or powder formed. Typically, the reaction temperature and the reaction pressure are higher than in gas phase or slurry process to maintain the polymer in solution. The solution process tends to use an inert solvent that dissolves the polymer as it is formed, subsequently the solvent is separated and the polymer is pelletized. The solution process is considered versatile in that a wide spectrum of product properties can be obtained by varying the composition of the catalyst system, the pressure, the temperature and the comonomer employed.

Since relatively small reactors are used for a solution process, the residence time is short and grade changeover can be rapid. For example two reactors in series operated at pressures of up to 50 bar and temperatures up to 250° C. in the reactor can be used. Fresh and recycled olefin monomer is compressed up to 55 bar and pumped into the polymerization reactor by a feed pump. The reaction is adiabatic and maintained at a maximum reactor outlet of about 250° C. Although a single reactor can be used, multiple reactors provide a narrower residence time distribution and therefore a better control of molecular weight distribution.

Another advantage of the present invention is that β-H transfer or elimination during step A) of olefin polymerization process is effectively blocked due to the use of a chain transfer reaction. Beta-hydride (or β-H) elimination is a reaction in which a polymeryl group containing β-hydrogens bonded to a metal center is converted into the corresponding macromolecular alkene and the corresponding metal-bonded hydride. Beta-hydride (or β-H) transfer to monomer is a reaction in which a polymeryl group containing β-hydrogens bonded to a metal center is converted into a macromolecular alkene and the hydride is transferred to an olefin coordinated to the metal thus forming another alkyl group bonded to said metal center. Alternatively, β-alkyl transfer or elimination is also know. In this case, the polymeryl must have an alkyl group (typically a methyl) on the β-carbon. β-Alkyl transfer or elimination typically results in unsaturated macromolecules, containing an allyl chain end, and a new metal alkyl. These are undesired processes since they lead to non-end-functionalized polyolefins.

Step B) Oxidation and Subsequent Metal Substitution

The second step of the process according to the present invention, being step B) relates to two sub-steps, the first being the oxidation of the product obtained in step A) using an oxidizing agent. The main group metal-functionalized first polyolefin blocks are oxidized in step B) to main group metal-functionalized oxidized first polyolefin blocks. The second sub step involves the metal substitution of the main group metal-functionalized oxidized first polyolefin blocks to oxidized first polyolefin blocks.

As oxidizing agent in step B) the following may be used: $O_2$, $CO$, $O_3$, $CO_2$, $CS_2$, $COS$, $R^2NCO$, $R^2NCS$, $R^2NCNR^3$, $CH_2=C(R^2)C(=O)OR^3$, $CH_2=C(R^2)(C=O)N(R^3)R^4$, $CH_2=C(R^2)P(=O)(OR^3)OR^4$, $N_2O$, $R^2CN$, $R^2NC$, epoxide, aziridine, cyclic anhydride, $R^3R^4C=NR^2$, $R^2C(=O)R^3$, and $SO_3$.

Preferably, the oxidizing agent is selected from oxygen ($O_2$), ozone ($O_3$), nitrous oxide ($N_2O$), epoxide, aziridine, $CH_2=C(R^2)C(=O)OR^3$ ((meth)acrylate), $CH_2=C(R^2)C(=O)N(R^3)R^4$ (acryl amide), $CH_2=C(R^2)P(=O)(OR^3)OR^4$ (acrylic or vinylic phosphonate), aldehyde ($R^2C(=O)R^3$), ketone ($R^2C(=O)R^3$) and imine ($R^3R^4C=NR^2$). These oxidizing agents provide either a metal-alkoxide or metal-amide functionalized polyolefin which can be used directly in step C). The remainder of the oxidizing agents leads to different metal-containing functionalized polyolefins and for these an additional step, e.g. a reaction with epoxide or aziridine, is required to obtain the metal-alkoxide or metal-amide functionalized polyolefin.

Said oxidizing agent may be according to Formula I explained below. Said oxidizing agent may be selected from the group consisting of all oxidizing agents specified in Table 1.

As oxidizing agent a compound according to the Formula (I): $XY_aZ^1_bZ^2_c$ may be used, wherein a, b, and c may be 0 or 1. FIG. 2 shows the structure of corresponding oxidizing agents. Table 1 shows an overview of possible oxidizing agents according to the present invention and several embodiments disclosed in that Table are discussed below.

In an embodiment, when a is 1 and b and c are 0 in the $XY_aZ^1_bZ^2_c$ oxidizing agent, the oxidizing agent is XY wherein Y is bonded via a double (Formula I-A) or triple bond (Formula I-B) to X. Examples of this type of oxidizing agents are $O_2$, and CO and $R^2NC$.

In an embodiment, when a and b are 1 and c is zero in the $XY_aZ^1_bZ^2_c$ oxidizing agent, the oxidizing agent is $XYZ^1$ wherein either Y and $Z^1$ are both bonded to X via a double bond (Formula I-C), or wherein Y is bonded to X via a single bond and $Z^1$ is bonded to X by a triple bond (Formula I-D), or wherein X and Y and $Z^1$ form a cyclic structure by means of single bonds between X and Y and Z (Formula I-E). Examples of these oxidizing agents are $CS_2$, COS, $R^2NCO$, $R^2NCNR^3$, $R^2NCS$, $CH_2=C(R^2)C(=O)OR^3$, $CH_2=C(R^2)(C=O)N(R^3)R^4$, $CH_2=C(R^2)P(=O)(OR^3)OR^4$, $N_2O$, $R^2CN$, epoxide, aziridine, and cyclic anhydride.

In an embodiment, when a, b and c are 1, the oxidizing agent is $XYZ^1Z^2$ wherein Y, $Z^1$ and $Z^2$ are each bonded to X via double bonds (Formula I-F) or wherein Y is bonded to X via a double bond and $Z^1$ and $Z^2$ are independently bonded to X via single bonds (Formula I-G). Examples of oxidizing agents are $R^3R^4C=NR^2$, $R^2C(=O)R^3$, and $SO_3$.

The oxidizing agent inserts in the main group metal-carbon.

TABLE 1

Overview of oxidizing agents and intermediate products obtained therewith.

| $XY_aZ^1_bZ^2_c$ Formula | a | b | c | X | Y | $Z^1$ | $Z^2$ | Oxidizing agent |
|---|---|---|---|---|---|---|---|---|
| I-A | 1 | 0 | 0 | O | O | — | — | $O_2$ |
| I-B | 1 | 0 | 0 | C | O | — | — | CO |
| I-B | 1 | 0 | 0 | C | $NR^2$ | — | — | $R^2NC$ |
| I-C | 1 | 1 | 0 | O | O | — | — | $O_3$ |
| I-C | 1 | 1 | 0 | C | O | O | — | $CO_2$ |
| I-C | 1 | 1 | 0 | C | S | S | — | $CS_2$ |
| I-C | 1 | 1 | 0 | C | O | S | — | COS |
| I-C | 1 | 1 | 0 | C | $NR^2$ | O | — | $R^2NCO$ |
| I-C | 1 | 1 | 0 | C | $NR^2$ | $NR^3$ | — | $R^2NCNR^3$ |
| I-C | 1 | 1 | 0 | C | $NR^2$ | S | — | $R^2NCS$ |
| I-C | 1 | 1 | 0 | $CH_2$ | $CR^2$ | $COOR^3$ | — | $CH_2=C(R^2)C(=O)OR^3$ |
| I-C | 1 | 1 | 0 | $CH_2$ | $CR^2$ | $C(=O)NR^3R^4$ | — | $CH_2=C(R^2)C(=O)NR^3R^4$ |
| I-C | 1 | 1 | 0 | $CH_2$ | $CR^2$ | $P(=O)(OR^3)OR^4$ | — | $CH_2=C(R^2)P(=O)(OR^3)OR^4$ |
| I-C | 1 | 1 | 0 | N | N | O | — | $N_2O$ |
| I-D | 1 | 1 | 0 | C | $R^2$ | N | — | $R^2CN$ |
| I-E | 1 | 1 | 0 | $C(R^2)R^3$ | $C(R^4)R^5$ | O | — | Epoxide |
| I-E | 1 | 1 | 0 | $C(R^2)R^3$ | $C(R^4)R^5$ | $NR^6$ | — | aziridine |
| I-E | 1 | 1 | 0 | C=O | $R^2$ | $C(=O)O$ | — | cyclic anhydride: —C(=O)$R^2$C(=O)O— |
| I-F | 1 | 1 | 1 | C | $NR^2$ | $R^3$ | $R^4$ | $R^3R^4C=NR^2$ |
| I-G | 1 | 1 | 1 | S | O | O | O | SO3 |
| I-F | 1 | 1 | 1 | C | O | $R^2$ | $R^3$ | $R^2C(=O)R^3$ |

| $XY_aZ^1_bZ^2_c$ Formula | Main group metal functionalized oxidized first polyolefin block | Oxidized first polyolefin block |
|---|---|---|
| I-A | Pol-O—M | Pol-O—$R^1$ |
| I-B | Pol-C(=O)—M | Pol-C(=O)—$R^1$ |
| I-B | Pol-C(=$NR^2$)—M | Pol-C(=$NR^2$)—M—$R^1$ |
| I-C | Pol-O—M | Pol-O—$R^1$ |
| I-C | Pol-C(=O)O—M | Pol-C(=O)O—$R^1$ |
| I-C | Pol-C(=S)S—M | Pol-C(=S)S—$R^1$ |
| I-C | Pol-C(=S)O—M or Pol-C(=O)S—M | Pol-C(=S)O—$R^1$M or Pol-C(=O)S—$R^1$ |
| I-C | Pol-C(=O)N($R^2$)—M or Pol-C(=$NR^2$)O—M | Pol-C(=O)N($R^2$)—$R^1$ or Pol-C(=$NR^2$)O—$R^1$ |
| I-C | Pol-C(=$NR^3$)$NR^2$—M or Pol-C(=$NR^2$)$NR^3$—M | Pol-C(=$NR^3$)$NR^2$—$R^1$ or Pol-C(=$NR^2$)$NR^3$—$R^1$ |
| I-C | Pol-C(=S)N($R^2$)—M or Pol-C(=$NR^2$)S—M | Pol-C(=S)N($R^2$)—$R^1$ or Pol-C(=$NR^2$)S—$R^1$ |
| I-C | Pol-$CH_2$C($R^2$)=C($OR^3$)O—M | Pol-$CH_2$C($R^2$)=C($OR^3$)O—$R^1$ |
| I-C | Pol-$CH_2$—C($R^2$)=C($NR^3R^4$)O—M | Pol-$CH_2$—C($R^2$)=C($NR^3R^4$)O—$R^1$ |
| I-C | Pol-$CH_2$—C($R^2$)=P($OR^3$)($OR^4$)O—M | Pol-$CH_2$—C($R^2$)=P($OR^3$)($OR^4$)O—$R^1$ |
| I-C | Pol-O—M | Pol-O—$R^1$ |
| I-D | Pol-C($R^2$)=N—M | Pol-C($R^2$)=N—$R^1$ |
| I-E | Pol-C($R^2$)$R^3$C($R^4$)$R^5$O—M | Pol-C($R^2$)$R^3$C($R^4$)$R^5$O—$R^1$ |
| I-E | Pol-C($R^2$)$R^3$C($R^4$)$R^5NR^6$—M | Pol-C($R^2$)$R^3$C($R^4$)$R^5NR^6$—$R^1$ |
| I-E | Pol-C(=O)—$R^2$—C(=O)O—M | Pol-C(=O)—$R^2$—C(=O)O—$R^1$ |
| I-F | Pol-C($R^3R^4$)—N($R^2$)—M | Pol-C($R^3R^4$)—N($R^2$)—$R^1$ |
| I-G | Pol-S(=O)$_2$O—M | Pol-S(=O)$_2$O—$R^1$ |
| I-F | Pol-C($R^2$)($R^3$)O—M | Pol-C($R^2$)($R^3$)O—$R^1$ |

The oxidizing agents as specified in Table 1 will be discussed in more detail here.

With respect to $O_2$, the metal carbon bond is cleaved and $O_2$ is inserted to form a peroxide. This initially formed peroxide decomposes to the metal alkoxide: M-Pol→M-O—O-Pol→M-O-Pol. After reaction with the metal substitution agent this will transform to: M-O-Pol→$R^1$—O-Pol. With respect to CO, the metal carbon bond is cleaved and the oxidizing agent is inserted to form a Pol-C(=O)-M. After reaction with the metal substitution agent this will transform to: Pol-C(=O)-M→Pol-C(=O)—$R^1$. With respect to $O_3$, the metal carbon bond is cleaved and O is inserted to form M-O-Pol. After reaction with the metal substitution agent this will transform to: M-O-Pol→R'—O-Pol. With respect to $CO_2$, the oxidizing agent inserts in the metal-carbon bond of the M-Pol to yield the corresponding Pol-C(=O)O-M functionality. After reaction with the metal substitution agent this will transform to: Pol-C(=O)O-M→Pol-C(=O)O—$R^1$. With respect to $CS_2$, the oxidizing agent inserts in the metal-carbon bond of the M-Pol to yield the corresponding Pol-C(=S)S-M functionality. After reaction with the metal substitution agent this will transform to: Pol-C(=S)S-M→Pol-C(=S)S—$R^1$. With respect to COS, the oxidizing agent inserts in the metal-carbon bond of the M-Pol to yield the corresponding Pol-C(=S)O-M or Pol-C(=O)S-M functionality. After reaction with the metal substitution agent this will transform to: Pol-C(=S)O-M→Pol-C(=S)O—$R^1$ or Pol-C(=O)S-M→Pol-C(=O)S—$R^1$. With respect to $R^2NCO$, the oxidizing agent inserts in the metal-carbon bond of the M-Pol to yield the corresponding Pol-C(=$NR^2$)O-M or Pol-C(=O)$NR^2$-M functionality. After reaction with the metal substitution agent this will transform to: Pol-C(=$NR^2$)O-M→Pol-C(=$NR^2$)O—$R^1$ or Pol-C(=O)$NR^2$-M→Pol-C(=O)$NR^2$—$R^1$. With respect to $R^2NCS$, the oxidizing agent inserts in the metal-carbon bond of the M-Pol to yield the corresponding Pol-C(=$NR^2$)S-M or Pol-C(=S)NR$^2$-M functionality. After reaction with the metal substitution agent this will transform to: Pol-C(=NR$^2$)S-M→Pol-C(=NR$^2$)S—R$^1$ or Pol-C(=S)NR$^2$-M→Pol-C(=S)NR$^2$—R$^1$. With respect to R$^2$NCNR$^3$, the oxidizing agent inserts in the metal-carbon bond of the M-Pol to yield the corresponding Pol-C(=NR$^2$)NR$^3$-M or Pol-C(=NR$^3$)NR$^2$-M functionality. After reaction with the metal substitution agent this will transform to: Pol-C(=NR$^3$)NR$^2$-M→Pol-C(=NR$^3$)NR$^2$—R$^1$. With respect to CH$_2$=CR$^2$COOR$^3$, the metal carbon bond is cleaved and the oxidizing agent is inserted to form a Pol-CH$_2$CR$^2$=C(OR$^3$)O-M. After reaction with the metal substitution agent this will transform to: Pol-CH$_2$CR$^2$=C(OR$^3$)O-M→Pol-CH$_2$CR$^2$=C(OR$^3$)O—R$^1$. With respect to CH$_2$=C(R$^2$)C(=O)NR$^3$R$^4$, the metal carbon bond is cleaved and the oxidizing agent is inserted to form a Pol-CH$_2$C(R$^2$)=C(NR$^3$R$^4$)O-M. After reaction with the metal substitution agent this will transform to: Pol-CH$_2$—C(R$^2$)=C(NR$^3$R$^4$)O-M→Pol-CH$_2$—C(R$^2$)=C(NR$^3$R$^4$)O—R$^1$. With respect to CH$_2$=C(R$^2$)P(=O)(OR$^3$)OR$^4$, the metal carbon bond is cleaved and the oxidizing agent is inserted to form a Pol-CH$_2$—C(R$^2$)=P(OR$^3$)(OR$^4$)O-M. After reaction with the metal substitution agent this will transform to: Pol-CH$_2$—C(R$^2$)=P(OR$^3$)(OR$^4$)O-M→Pol-CH$_2$—C(R$^2$)=P(OR$^3$)(OR$^4$)O—R$^1$. With respect to N$_2$O, the metal carbon bond is cleaved and oxygen is inserted to form an M-O-Pol. With respect to R$^2$CN, the metal carbon bond is cleaved and the oxidizing agent is inserted to form a Pol-C(R$^2$)=N-M. After reaction with the metal substitution agent this will transform to: Pol-C(R$^2$)=N-M→Pol-C(R$^2$)=N—R$^1$. With respect to R$^2$NC, the metal carbon bond is cleaved and the oxidizing agent is inserted to form a Pol-C(=NR$^2$)-M. After reaction with the metal substitution agent this will transform to: Pol-C(=NR$^2$)-M→Pol-C(=NR$^2$)—R$^1$. With respect to epoxide, the metal carbon bond is cleaved and the oxidizing agent is inserted to form a Pol-C(R$^2$)R$^3$C(R$^4$)R$^5$O-M. After reaction with the metal substitution agent this will transform to: Pol-C(R$^2$)R$^3$C(R$^4$)R$^5$O-M→Pol-C(R$^2$)R$^3$C(R$^4$)R$^5$O—R$^1$. With respect to aziridine, the metal carbon bond is cleaved and the oxidizing agent is inserted to form a Pol-C(R$^2$)R$^3$C(R$^4$)R$^5$NR$^6$-M. After reaction with the metal substitution agent this will transform to: Pol-C(R$^2$)R$^3$C(R$^4$)R$^5$NR$^6$-M→Pol-C(R$^2$)R$^3$C(R$^4$)R$^5$NR$^6$—R$^1$. With respect to cyclic anhydride, the metal carbon bond is cleaved and the oxidizing agent is inserted to form a Pol-C(=O)—R$^2$—C(=O)O-M. After reaction with the metal substitution agent this will transform to: Pol-C(=O)—R$^2$—C(=O)O-M→Pol-C(=O)—R$^2$—C(=O)O—R$^1$. With respect to imine, the metal carbon bond is cleaved and the oxidizing agent is inserted to form a Pol-C(R$^3$)(R$^4$)—N(R$^2$)-M. After reaction with the metal substitution agent this will transform to: Pol-C(R$^3$)(R$^4$)—N(R$^2$)-M→Pol-C(R$^3$)(R$^4$)—N(R$^2$)—R$^1$. With respect to SO$_3$, the metal carbon bond is cleaved and the oxidizing agent is inserted to form a Pol-S(=O)$_2$O-M. After reaction with the metal substitution agent this will transform to: Pol-S(=O)$_2$O-M→Pol-S(=O)$_2$O—R$^1$. With respect to a ketone or aldehyde, the metal carbon bond is cleaved and the oxidizing agent is inserted to form a Pol-C(R$^2$)(R$^3$)O-M. After reaction with the metal substitution agent this will transform to: Pol-C(R$^2$)(R$^3$)O-M→Pol-C(R$^2$)(R$^3$)O—R$^1$.

R$^1$ is obtained after the reaction with the metal substitution agent. It is selected from the group consisting of H, SiR$^7_3$, SnR$^7_3$ or a hydrocarbyl with 1 to 16 carbon atoms. Most preferably R$^1$ is hydrogen.

R$^2$, R$^3$, R$^4$, R$^5$, R$^6$ are each independently selected from the group consisting of H, SiR$^7_3$, SnR$^7_3$ or a C1-C16 hydrocarbyl, preferably selected from hydrogen or C1-C16 hydrocarbyl; where each R$^7$ is independently selected from hydride, halide or C1-C16 hydrocarbyl.

In an embodiment, the oxidation step may be carried at a pressure between 1 and 80 bar. In an embodiment, the oxidation step is carried out at a temperature of between 0° C. and 250° C.

In an embodiment, the oxidation step may be carried out for a time period of between 0.5 minutes and 150 minutes, more preferably between 1 minutes and 120 minutes, depending on the reaction temperature and the oxidizing agent.

It should be noted that depending on the reaction conditions different oxidizing agents may be preferred.

Using the catalyst system according to the present invention a degree of chain-end-functionalization of at least 30% of the polyolefins can be obtained, preferably at least 40%, or even at least 50%, or at least 60% or at least 70%, more preferably at least 80%, even more preferably at least 90%, most preferably at least 95%.

In the second sub step of step B) a metal substituting agent is used to replace the main group metal or in other words to detach the main group metal from the polymer chain. Said metal substituting agent may be selected from the group consisting of hydrolyzing agents or quenching agents.

In an embodiment, said metal substituting agent is a hydrolyzing agent, selected from the group of protic solvents, e.g. water or an alcohol, such as (acidified) methanol or ethanol, preferably water.

In an embodiment, said metal substituting agent is a quenching agent, which is typically a halogen-containing agent releasing a metal-halide or an anhydride releasing a metal-carboxylate. Typical examples are alkyl halides and anhydrides. In one embodiment of the invention, the product obtained after step B) can be premixed with a catalyst to be used in step C) prior to step C)

Step C) Forming Second Polymer Block

As discussed above the second polymer block is formed during step C. It may for example be grown via ROP or it may be added via transesterification.

In case during step C) a polar block is introduced, the polarity of this polar block may be tuned e.g. by adding during step C) a combination of multiple cyclic monomers of different polarity, by tuning of the polarity of the second polymer block during the pre-synthesis by using combinations of monomers before attaching it to the polyolefin block via transesterification, by adding during step C) a combination of multiple second polymers of different polarity, or by adding during step C) a combination of cyclic monomers and a second polymer that can be attached via transesterification. The melt temperature and/or glass transition temperature of the resulting second block of the block copolymer may also be tuned while conserving the crystalline properties by selecting suitable monomers for the second block. In other words, both the physical and mechanical properties may be tuned using the present invention. In addition, the hydrolysis and degradation properties of the second block may be tuned while not affecting the polyolefin block.

In an embodiment, after step B) and prior to step C) an additional step D) is carried out, wherein step D) comprises reacting the first polyolefin block containing at least one oxidized chain end obtained in step B) with ROP and/or transesterification catalyst to form a first polyolefin block which can acts as catalytic initiator to obtain a second block.

In case during step C) a polyethylene-like polymer block is introduced, the polymers obtained may be used as compatibilizers for polyolefin-PE blends, in particular iPP-PE blends, wherein PE may for example be LDPE, LLDPE, or HDPE. In case branched second polymer blocks are used, the resulting polymer may be particularly useful for the compatibilization with LDPE and LLDPE.

When it is stated that a second polymer block is formed on the first polyolefin block, the second block is covalently attached to said first block.

In an embodiment, during step C) a diblock copolymer is added to the first block in which case an A-B-C triblock copolymer or a C-B-A-B-C pentablock copolymer is obtained. This can be achieved by pre-synthesizing an A-B diblock copolymer where a block B is added to the polyolefin block (A) using ROP or transesterification to form block B followed by ROP to form block C. It is possible that the B blocks are polyethylene-like blocks and the C blocks are polar blocks or that both B and C blocks are polar blocks or that both blocks B and C are different polar blocks. In a specific embodiment, the B block is a polyethylene-like polymer block and the C block is a polar block selected from polyester, polycarbonate, polyamide, and others as specified above.

Step C) is preferably carried out in an inert atmosphere.
Ring-Opening Polymerization Reaction to Grow Second Polymer Block.

During step C) of the inventive process the second block may be formed by ROP of cyclic monomers. The functionalized chain end (or both) of the functionalized first polyolefin block act(s) as an initiator where further cyclic monomers can react by opening their ring system and form a longer polymer chain.

The cyclic monomers as preferably used by the present invention are oxygen containing cyclic compounds. The mechanism of ROP is well known to a skilled person and described for example in the Handbook of Ring-Opening Polymerization, 209, Eds. P. Dubois, O. Coulembier, J.-M. Raquez, Wiley VCH, ISBN: 9783527319534.

A mixture of cyclic monomers may also be used to form a random second polymer block to tune the properties. Also the sequential addition of different cyclic monomers may be used.

In an embodiment, the cyclic monomer for use in ROP is a polar monomer. The polar cyclic monomer is preferably selected from the group consisting of a lactone, a lactide, a cyclic oligoester (e.g. a di-ester, a tri-ester, a tetra-ester, a penta-ester or higher oligoesters), an epoxide, an aziridine, a combination of epoxide and/or aziridine and $CO_2$, a cyclic anhydride, a combination of epoxide and/or aziridine and a cyclic anhydride, a combination of epoxide and/or aziridine and $CO_2$ and a cyclic anhydride, a cyclic N-carboxyanhydride, a cyclic carbonate, a lactam and one or more combinations thereof.

Lactone is used to prepare polylactone blocks; lactide is used to prepare polylactide blocks; cyclic oligoester (e.g. a di-ester, a tri-ester, a tetra-ester or a penta-ester) is used to prepare different types of polyester blocks; epoxide is used to prepare polyether blocks using ROP; a combination of epoxide and $CO_2$ is used to prepare polycarbonate blocks or poly(carbonate-co-ether) blocks; a combination of epoxide and a cyclic anhydride is used to prepare polyester blocks or poly(ester-co-ether) blocks; a combination of epoxide, cyclic anhydride and $CO_2$ is used to prepare poly(carbonate-co-ester) blocks or poly(carbonate-co-ester-co-ether) blocks; an N-carboxyanhydride is used to produce polypeptide blocks; a carbonate is used to prepare polycarbonate or polycarbonate-co-ether blocks.

Other cyclic monomers are cyclic sulfur containing compounds such as sulfides; cyclic nitrogen containing compounds such as amines (aziridines), lactams, urethanes, ureas; cyclic phosphorus containing compounds such as phosphates, phosphonates, phosphites, phosphines and phosphazenes; and cyclic silicon containing compounds such as siloxanes, and silyl ethers.

In an embodiment, the at least one cyclic monomer for use in ROP is a monomer selected from the group consisting of cyclic hydrocarbyls containing a reactive functionality that can undergo a transesterification reaction at a carbonyl group-containing functionality, such as macrolactones or macrooligolactones, whereby the monomer comprises at least 10 consecutive carbon atoms in the ring/cycle.

In case the cyclic monomer is a cyclic ester, it may be a cyclic ester having a ring size from 4-40 atoms. Preferably the atoms forming the ring, other than the oxygen of the ester functionality or ester functionalities in the case of cyclic oligoesters, are carbon atoms.

A lactone is a cyclic compound having one ester group; a dilactone is a compound having two ester groups; a trilactone is a compound having three ester groups; a tetralactone is a compound having four ester groups; a pentalactone is a compound having five ester groups; an oligolactone is a compound having 2-20 ester groups.

Examples of cyclic esters that can be used as monomer in step C) include β-propiolactone, β-butyrolactone, γ-valerolactone, ε-caprolactone, ε-decalactone, glycolide, lactide (L, D, meso), ethylene brassylate, butylene brassylate, cyclic butyl terephthalate, cyclic butyl adipate, cyclic butyl succinate, cyclic butyl terephthalate oligomers.

The cyclic esters, in particular where these are lactones, may be in any isomeric form and may further contain organic substituents on the ring that do not prevent the ROP. Examples of such cyclic esters include 4-methyl caprolactone or ε-decalactone.

It is further possible that the cyclic ester comprise one or more unsaturations in the ring. Examples of such cyclic esters include 5-tetradecen-14-olide or 11-pentadecen-15-olide.

The cyclic ester may further have one or more heteroatoms in the ring, provided that such do not prevent the ROP. Examples of such cyclic esters include 1,4-dioxepan-5-one, 1,5-dioxepan-2-one, 3,6-dimethylmorpholine-2,5-dione, 1,4-oxazepan-7-one, 4-methyl-1,4-oxazepan-7-one, 10-oxahexadecanolide, 11-oxahexadecanolide, 12-oxahexadecanolide and 12-oxahexadecen-16-olide.

In an embodiment, first a monomer is used to form a second block and subsequently a polar monomer is used to form an additional block on the polyethylene-like block, viz. polyolefin-polyethylen-like-polar or polar-polyethylene-like-polyolefin-polyethylene-like-polar in case of a telechelic polyolefin block. In an embodiment, the polyolefin is isotactic PP, the polyethylene-like polymer is a PAmb or PPDL and the polar polymer is PCL or PLA.

Transesterification to Add Second Polymer Block

During step C) a transesterification reaction can be carried out to add a second polymer block to at least one chain end of the first polymer block.

The result of step B) is an oxidized first polymer block having at one or both chain ends a reactive functional group. This reactive oxidized first polyolefin block can be used in a transesterification reaction with a transesterifiable polymer.

In the context of the present invention, a transesterification reaction describes the reaction of a nucleophilic chain end with a carbonyl group-containing functionality present in a polymer added during step C).

A transesterifiable polymer may thereby for example be selected from the group consisting of a polyester, a polycarbonate, a polyamide, a polyurethane, a polyurea, a random or block poly(carbonate-ester), poly(carbonate-ether), poly(ester-ether), poly(carbonate-ether-ester), poly(ester-amide), poly(ester-ether-amide), poly(carbonate-amide), poly(carbonate-ether-amide), poly(ester-urethane), poly(ester-ether-urethane), poly(carbonate-urethane), poly(carbonate-ether-urethane), poly(ester-urea), poly(ester-ether-urea), poly(carbonate-urea), poly(carbonate-ether-urea), poly(ether-amide), poly(amide-urethane), poly(amide-urea), poly(urethane-urea) or one or more combination thereof.

In an embodiment, besides a second polymer block also cyclic monomers are added to provide a combination of ROP and transesterification reactions to yield the final "polyolefin-b-polar polymer" or "polyolefin-b-polyethylene-like polymer". This approach provides a versatile method to tune the physical and mechanical properties of the second polymer block of the block copolymer.

In an embodiment, a co-catalyst is present during step C) in case of transesterification reaction. More preferably, when using a Cr- or Co-based catalyst and using epoxide and/or aziridines in combination with $CO_2$ or using epoxide and/or aziridines in combination with cyclic anhydride or using epoxide and/or aziridines in combination with $CO_2$ and cyclic anhydrides. Examples of a co-catalyst suitable for use are N-methyl-imidazole, 4-dimethylanimopyridine, bis(triphenyl-phosphoranylidene)-ammonium chloride) bis(triphenylphosphoranylidene)ammonium azide), tricyclehexylphosphine, triphenylphosphine, tris(2,4,6-trimethoxyphenyl)phosphine and 1,5,7-triazabicyclododecene.

For the ROP or transesterification reaction a catalyst is used. Specific examples of catalysts include among others mineral acids, organic acids, organic bases, metallic compounds such as hydrocarbyls, oxides, chlorides, carboxylates, alkoxides, aryloxides, amides, salen complexes, β-ketiminato complexes, guanidinato complexes of tin, titanium, zirconium, aluminum, bismuth, antimony, magnesium, calcium and zinc and lipase enzymes. Examples of suitable catalysts are as reported by J. Otera and J. Nishikido, Esterification, p. 52-99, Wiley 2010.

Examples of organic acid as catalysts for ROP or transesterification according to the present invention are the following, an acid selected from the group comprising diethylether complex of hydrogen chloride, fluorosulfonic acid, trifluoromethanesulfonic acid, methyl trifluorosulfonate, ethyl trifluoromethane-sulfonate n-propyl trifluorosulfonate, and i-propyl trifluorosulfonate)), metal (yttrium, aluminum, bismuth) triflates, the acidic catalyst may also be selected from a group of compounds that are formed by combining a strong Lewis acid and a strong Brønsted acid. A specific example of such a compound is an equimolar combination of fluorosulfonic acid and antimony pentafluoride.

The amount of the catalyst used for step C) is selected from a range of for example 0.0001 to 0.5% by weight, preferably 0.001 to 0.1% by weight based on the cyclic ester, or the number of carbonyl group-containing functionalities in the second polymer block added during step C).

After step C) is finished, the block-copolymer is obtained. In an embodiment, the reaction mixture is quenched using a quenching agent, preferably a protic polar reagent, more preferably an alcohol, preferably methanol or ethanol. However, water can also be used. The product obtained after this quenching is a crude product which may contain also the polyolefin obtained in step A) and/or polymer obtained from the ROP or transesterification reaction in step C) that is not attached to the first polyolefin block. For most applications, however, the crude product may be used as such without further purification.

If polymer obtained from the ROP or transesterification reaction in step C) has to be removed from the product, this crude product may for example be subjected to an additional step of work up. This work up step may comprise a precipitation. For example a precipitation in a solvent, such as THF or other organic solvents, such as chloroform. This can also be called an extraction in case the second block comprises a polar block because any polar polymer formed will be extracted out of the crude product leaving the block copolymer and possibly polyolefin.

A person skilled in the art will be able to determine the required steps in order to purify the block copolymer products, using e.g. one or more precipitation and/or extraction steps using one or more solvents. The product may also be dried prior to use thereof.

Further Embodiments

The present invention relates to a three-step process for the preparation of block copolymers.

Using the process according to the present invention, block copolymers can be obtained. In an embodiment, the block copolymer has an number average molecular weight ($M_n$) for example between 500 and 1,000,000 g/mol, preferably between 1,000 and 200,000 g/mol.

The polyolefins according to the present invention preferably have a polydispersity index (Ð) of between 1.1 and 10.0, more preferably between 1.1 and 5.0, even more preferably between 1.1 and 4.0.

The polyolefin blocks may be linear or branched (both long chain branched and short chain branched), atactic, isotactic or syndiotactic, preferably, isotactic polyolefins in the case of poly-α-olefins, wherein the isotactic polyolefin is preferably isotactic polypropylene.

According to a specific, non-limiting embodiment of the present invention, the polyolefin block may be linear low density polyethylene (LLDPE), high density polyethylene (HDPE), ethylene-propylene copolymer (EP), atactic, isotactic or syndiotactic PP (aPP, iPP, sPP, respectively), poly-4-methyl-1-pentene (P4M1P) or atactic, isotactic or syndiotactic polystyrene (aPS, iPS, sPS, respectively).

The block copolymers according to the present invention may have a mass fraction of polyolefin (mfPol) of between 10% and 90%, preferably between 30% and 70%. The mass fraction mfPol is defined by the mass of the polyolefin divided by the total mass of the block copolymer.

The block copolymers according to the present invention may have a volume fraction of second polymer (vfPol) of between 90% and 10%, preferably between 70% and 30%. The volume fraction vfPol is defined by the volume of the second polymer block(s) divided by the total volume of the block copolymer.

Examples of polymers having a polyolefin first block and a polar polymer second block that can be prepared using the present method are HDPE-b-PCL, HDPE-b-PLA, HDPE-b-PBA, HDPE-b-PBS, HDPE-b-PEB, HDPE-b-poly(CL-co-PDL), HDPE-b-poly(BA-co-EB), HDPE-b-poly(BA-co-PDL), LLDPE-b-PCL, LLDPE-b-PLA, LLDPE-b-PBA, LLDPE-b-PBS, LLDPE-b-PEB, LLDPE-b-poly(BA-co-EB), LLDPE-b-poly(CL-co-PDL), LLDPE-b-poly(BA-co-PDL), EP-b-PCL, EP-b-PLA, EP-b-PBA, EP-b-PBS, EP-b-

PEB, EP-b-poly(BA-co-EB), EP-b-poly(CL-co-PDL), EP-b-poly(BA-co-PDL), aPP-b-PCL, iPP-b-PLA, aPP-b-PBA, aPP-b-PBS, aPP-b-PEB, aPP-b-poly(BA-co-EB), aPP-b-poly(CL-co-PDL), aPP-b-poly(BA-co-PDL), iPP-b-PCL, iPP-b-PLA, iPP-b-PBA, iPP-b-PBS, iPP-b-PEB, iPP-b-poly(BA-co-EB), iPP-b-poly(CL-co-PDL), iPP-b-poly(BA-co-PDL), sPP-b-PCL, sPP-b-PLA, sPP-b-PBA, sPP-b-PBS, sPP-b-PEB, sPP-b-poly(BA-co-EB), sPP-b-poly(CL-co-PDL), sPP-b-poly(BA-co-PDL), iP4M1P-b-PCL, iP4M1P-b-PBA, iP4M1P-b-PBS, iP4M1P-b-PEB, iP4M1P-b-poly(BA-co-EB), iP4M1P-b-poly(CL-co-PDL), iP4M1P-b-poly(BA-co-PDL), aPS-b-PCL, aPS-b-PBA, aPS-b-PBS, aPS-b-PEB, aPS-b-poly(BA-co-EB), aPS-b-poly(CL-co-PDL), aPS-b-poly(BA-co-PDL), iPS-b-PCL, iPS-b-PBA, iPS-b-PBS, iPS-b-PEB, iPS-b-poly(BA-co-EB), iPS-b-poly(CL-co-PDL), iPS-b-poly(BA-co-PDL), sPS-b-PCL, sPS-b-PBA, sPS-b-PBS, sPS-b-PEBL, sPS-b-poly(BA-co-EB), sPS-b-poly(CL-co-PDL), sPS-b-poly(BA-co-PDL) and many other polymers.

Examples of polymers having a polyolefin first block and a polyethylene-like polymer second block that can be prepared using the present method are HDPE-b-PPDL, HDPE-b-PAmb, HDPE-b-poly(PDL-co-Amb), LLDPE-b-PPDL, LLDPE-b-PAmb, LLDPE-b-poly(PDL-co-Amb), EP-b-PPDL, EP-b-PAmb, EP-b-poly(PDL-co-Amb), aPP-b-PPDL, aPP-b-PAmb, aPP-b-poly(PDL-co-Amb), iPP-b-PPDL, iPP-b-PAmb, iPP-b-poly(PDL-co-Amb), sPP-b-PPDL, sPP-b-PAmb, sPP-b-poly(PDL-co-Amb), iP4M1P-b-PPDL, iP4M1P-b-PAmb, iP4M1P-b-poly(PDL-co-Amb), aPS-b-PPDL, aPS-b-PAmb, aPS-b-poly(PDL-co-Amb), iPS-b-PPDL, iPS-b-PAmb, iPS-b-poly(PDL-co-Amb), sPS-b-PPDL, sPS-b-PAmb, sPS-b-poly(PDL-co-Amb).

Examples of polymers having a polyolefin first block, a polyethylene-like polymer second block and a polar polymer third block that can be prepared using the present method are HDPE-b-PPDL-b-PCL, HDPE-b-PAmb-b-PCL, HDPE-poly(PDL-co-Amb)-b-PCL, LLDPE-b-PPDL-b-PCL, LLDPE-b-PAmb-b-PCL, LLDPE-poly(PDL-co-Amb)-b-PCL, EP-b-PPDL-b-PCL, EP-b-PAmb-b-PCL, EP-b-poly(PDL-co-Amb)-b-PCL, aPP-b-PPDL-b-PCL, aPP-b-PAmb-b-PCL, aPP-poly(PDL-co-Amb)-b-PCL, iPP-b-PPDL-b-PCL, iPP-b-PAmb-b-PCL, iPP-poly(PDL-co-Amb)-b-PCL, sPP-b-PPDL-b-PCL, sPP-b-PAmb-b-PCL, sPP-poly(PDL-co-Amb)-b-PCL, iP4M1P-b-PPDL-b-PCL, iP4M1P-b-PAMb-b-PCL, iP4M1P-b-poly(PDL-co-Amb)-b-PCL, aPS-b-PPDL-b-PCL, aPS-b-PAmb-b-PCL, aPS-poly(PDL-co-Amb)-b-PCL, iPS-b-PPDL-b-PCL, iPS-b-PAmb-b-PCL, iPS-poly(PDL-co-Amb)-b-PCL, sPS-b-PPDL-b-PCL, sPS-b-PAmb-b-PCL, sPS-poly(PDL-co-Amb)-b-PCL.

The block copolymers prepared according to the present invention may for example be used to introduce polar properties to enhance the interfacial interactions in polyolefins blends with polar polymers or blends with different polyolefins with PEs. They may be used as compatibilizers to improve properties such as adhesion. They may be used to improve barrier properties, especially against oxygen, for polyolefin films. They may be used as compatibilizers to highly polar polymers such as starch, cellulose or EVOH, or for polyolefin-based composites with inorganic fillers such as glass or talc. They may be used in drug delivery devices, nonporous materials/membranes.

In an embodiment, the first polyolefin block is attached to the second polymer block which is a polyester and the polymer obtained is a di-block copolymer (polyolefin-block-polyester). This di-block copolymer can for example be used for packaging applications. In an embodiment, this di-block copolymer is prepared using ROP using a cyclic ester. In an embodiment, the polyolefin is LLDPE.

According to a specific, non-limiting embodiment of the present invention, the polyolefin block may be HDPE, LLDPE, EP, aPP, iPP, sPP, iP4M1P, aPS, iPS or sPS.

In an embodiment, in case the second block is formed by ROP and when the first polyolefin block is HDPE, the second polymer block can preferably not be polycaprolactone, polyvalerolactone or polylactic acid. In an embodiment, in case the second block is formed by ROP and when the first polyolefin block is iPP, the second polymer block can preferably not be not polycaprolactone, polyvalerolactone or polylactic acid.

Advantages of the Present Invention

An advantage of the present invention is the versatility of the process allowing the production of a large variety of block copolymers with tuned properties.

An advantage of the present invention is that it is possible to produce a wide variety of block copolymers, e.g. diblock A-B or triblock B-A-B or triblock A-B-C or pentablock C-B-A-B-C, depending on the need of the specific application.

After chain transfer of the polyolefin to a main group metal hydrocarbyl or a main group metal hydride, in situ oxidation and metal substitution and successive formation of at least one second polymer block either by using a grafting from approach growing a second polymer block by ROP of one or more cyclic monomers or by using a grafting onto approach adding a second polymer block via transesterification, the desired block copolymers can be obtained in high yield.

EXAMPLES

The invention is further illustrated by the following non-limiting examples merely used to further explain certain embodiments of the present invention.

Regarding the steps A) and B) according to the present invention, the preparation of first polyolefin blocks having a hydroxyl-functionalized chain end is discussed below.

All manipulations were performed under an inert dry nitrogen atmosphere using either standard Schlenk or glove box techniques. Dry, oxygen free toluene was employed as solvent for all polymerizations.

Preparation of First Polyolefin Block Having a Hydroxyl-Functionalized Chain End The polymerization was carried out in a stainless steel stirred reactor having a reaction volume of 300 mL. The reactor was kept at a constant temperature of 40° C. Toluene (70 mL) and MAO solution (5 mL of 30% solution in toluene, Al/Zr≈1000) were added and stirred at 50 rpm for 30 min. TIBA (4 mL, 1.0 M solution in hexanes, Al/Zr≈200 equiv.) and DEZ (1.0 mL, 1.0 M solution in hexanes, Al/Zr≈50 equiv.) were added and stirred for 10 min. The solution was saturated with a predefined pressure of olefin—either ethylene or propylene. In a glove box, the catalyst was dissolved in toluene (3 mL) and transferred into the reactor. The reactor was then pressurized to the desired pressure (2 bars) of olefin and the pressure was maintained for a predefined time (15 min, step A)). At the end of polymerization, the olefin feed was stopped and after releasing the residual olefin pressure, air was injected through a gas injection tube and the suspension was maintained under constant oxygen pressure of 3 bars at 60° C. for 2 h with rigorous stirring (600 rpm, step B). At the end of oxidation step, the polymer was quenched in acidified methanol (used as metal substituting agent, step B)) to obtain the hydroxyl-functionalized first polyolefin block (either PE or iPP) that is then filtered, washed with methanol and dried at 60° C. in vacuum overnight.

All examples below relate to step C) of the process according to the present invention, wherein a second polymer block is formed using a previously prepared first polyolefin block having a functionalized chain end, especially for example a hydroxyl functionalized chain end.

Example 1

Typical procedure for synthesis of HDPE-b-PCL copolymers: A glass crimp cap vial was charged with toluene (1.5 mL), ε-caprolactone (CL, 0.513 g, 4.5 mmol), hydroxyl end-capped HDPE (13 mg, 8.7 μmol) and catalyst 1 (3.0 mg, 8.7 μmol). All manipulations were carried out in the glovebox. Then, the mixture was removed from the glovebox and stirred in an oil bath at 100° C. for 5 h. The progress of the reaction was followed by $^1$H NMR spectroscopy by taking aliquots at set time intervals. The synthesized copolymer was cooled to room temperature and quenched using acidified methanol, isolated and dried in vacuum at room temperature for 18 h. Table 2, entry HDPE-PCL1 specifies the reaction conditions, molecular weight ($M_n$ and $M_w$), Đ and the CL conversion.

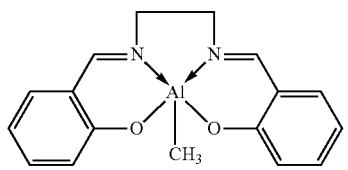

Example 2

The same procedure was used as for example 1, with this difference that catalyst 2 was used instead of 1. Table 2, entries HDPE-PCL2-HDPE-PCL6 specify several reaction conditions, molecular weight ($M_n$ and $M_w$), Đ and the CL conversion for the present example with catalyst 2.

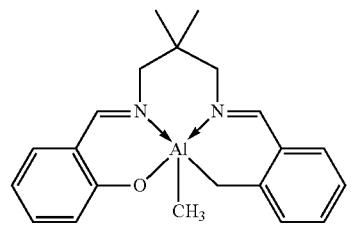

Example 3

The same procedure was used as for example 1, with this difference that 1 was premixed with the hydroxyl end-capped HDPE for 24 h at 100° C. prior to ROP. Table 2, entry HDPE-PCL7 specifies the reaction conditions, molecular weight ($M_n$ and $M_w$), Đ and the CL conversion for the present example.

Example 4

The same procedure was used as for example 2, with this difference that 2 was premixed with the hydroxyl end-capped HDPE for 24 h at 100° C. prior to ROP. Table 2, entry HDPE-PCL8-HDPE-PCL9 specify the reaction conditions, molecular weight ($M_n$ and $M_w$), Đ and the CL conversion for the present example.

Example 5

Typical procedure for synthesis of HDPE-b-PPDL copolymers: A glass crimp cap vial was charged with toluene (1.5 mL), pentadecalactone (PDL, 1 g, 4.5 mmol), hydroxyl end-capped HDPE (13 mg, 8.7 μmol) and catalyst 1 (3.0 mg, 8.7 μmol). All manipulations were carried out in the glovebox. Then, the mixture was removed from the glovebox and stirred in an oil bath at 100° C. The progress of the react ion was followed by $^1$H NMR spectroscopy by taking aliquots at set time intervals. The synthesized copolymer was cooled to room temperature and quenched using acidified methanol, isolated and dried in vacuum at room temperature for 18 h. Table 2, entries HDPE-PPDL1 and HDPE-PPDL2 specify the reaction conditions, molecular weight ($M_n$ and $M_w$), Đ and the PDL conversion for the present example.

TABLE 2

Ring-opening polymerization of CL and PDL initiated by hydroxyl-end capped HDPE affording HDPE-b-PCL and HDPE-b-PPDL block copolymers.

| entry | cat. | CL/PDL/cat./initiator | time [h] | T [° C.] | $M_n$ [kg/mol] | $M_w$ [kg/mol] | Đ | conv. [%] |
|---|---|---|---|---|---|---|---|---|
| HDPE-PCL1 | 1 | 1000/0/1/1 | 5 | 100 | 22520 | 40330 | 1.8 | 97 |
| HDPE-PCL2 | 2 | 1000/0/1/1 | 0.5 | 100 | 9940 | 19100 | 1.9 | 95 |
| HDPE-PCL3 | 2 | 1000/0/1/1 | 1 | 100 | 18380 | 31340 | 1.7 | 97 |
| HDPE-PCL4 | 2 | 1000/0/1/1 | 5 | 100 | 30110 | 48900 | 1.6 | 99 |
| HDPE-PCL5 | 2 | 1000/0/1/1 | 0.5 | 80 | 2450 | 5780 | 1.8 | 95 |
| HDPE-PCL6 | 2 | 1000/0/1/1 | 1 | 80 | 19200 | 32860 | 1.7 | 97 |
| HDPE-PCL7* | 1 | 1000/0/1/1 | 5 | 100 | 15450 | 26520 | 1.7 | 98 |
| HDPE-PCL8* | 2 | 1000/0/1/1 | 0.5 | 100 | 46700 | 80250 | 1.7 | 95 |
| HDPE-PCL9* | 2 | 1000/0/1/1 | 1 | 100 | 51000 | 83930 | 1.6 | 95 |
| HDPE-PPDL1 | 1 | 0/1000/1/1 | 22 | 100 | 64580 | 131960 | 2.0 | 91 |
| HDPE-PPDL2 | 1 | 0/1000/1/1 | 5 | 100 | 47490 | 78260 | 1.6 | 42 |

For the reactions marked with * the catalyst was reacted with the initiator/first block at 100° C. for 24 h prior to ROP.

Example 6

Typical procedure for synthesis of iPP-b-PCL copolymers: A glass crimp cap vial was charged with toluene (1.5 mL), CL (0.513 g, 4.5 mmol), hydroxyl end-capped iPP (17.4 mg, 8.7 µmol) and catalyst 1 (3.0 mg, 8.7 µmol). All manipulations were carried out in the glovebox. Then, the mixture was removed from the glovebox and stirred in an oil bath at 100° C. The progress of the reaction was followed by $^1$H NMR spectroscopy by taking aliquots at set time intervals. The synthesized copolymer was cooled to room temperature and quenched using acidified methanol, isolated and dried in vacuum at room temperature for 18 h. Table 3, entries iPP-PCL1-iPP-PCL6 specify the reaction conditions, molecular weight ($M_n$ and $M_w$), Đ and the CL conversion for the present example.

Example 7

The same procedure was used as for example 6, with this difference that catalyst 2 was used instead of 1. Table 3, entries iPP-PCL7-iPP-PCL12 specify the reaction conditions, molecular weight ($M_n$ and $M_w$), Đ and the CL conversion for the present example.

Example 8

The same procedure was used as for example 6, with this difference that 1 was premixed with the hydroxyl end-capped iPP for 24 h at 100° C. prior to ROP. Table 3, entries iPP-PCL13-iPP-PCL18 specify the reaction conditions, molecular weight ($M_n$ and $M_w$), Đ and the CL conversion for the present example.

Example 9

The same procedure was used as for example 7, with this difference that 2 was premixed with the hydroxyl end-capped iPP for 24 h at 100° C. prior to ROP. Table 3, entries iPP-PCL19-iPP-PCL24 specify the reaction conditions, molecular weight ($M_n$ and $M_w$), Đ and the CL conversion for the present example.

Example 10

The same procedure was used as for example 6, with this difference that catalyst 3 was used instead of 1. Table 3, entry iPP-PCL25 specifies the reaction conditions, molecular weight ($M_n$ and $M_w$), Đ and the CL conversion for the present example.

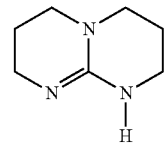

3

TABLE 3

Ring-opening polymerization of CL initiated by hydroxyl-end capped iPP affording iPP-b-PCL block copolymers.

| entry | cat. | CL/cat./initiator | time [h] | T [° C.] | $M_n$ [g/mol] | $M_w$ [g/mol] | Đ | conv. [%] |
|---|---|---|---|---|---|---|---|---|
| iPP-PCL1 | 1 | 250/1/1 | 2 | 100 | 12300 | 24500 | 2.0 | 92 |
| iPP-PCL2 | 1 | 250/1/1 | 5 | 100 | 18200 | 37300 | 2.1 | 90 |
| iPP-PCL3 | 1 | 500/1/1 | 2 | 100 | 36000 | 70600 | 2.0 | 93 |
| iPP-PCL4 | 1 | 500/1/1 | 5 | 100 | 45600 | 44300 | 1.9 | 88 |
| iPP-PCL5 | 1 | 1000/1/1 | 2 | 100 | 48600 | 85400 | 1.8 | 62 |
| iPP-PCL6 | 1 | 1000/1/1 | 5 | 100 | 34100 | 68600 | 2.0 | 93 |
| iPP-PCL7 | 2 | 1000/1/1 | 5 | 100 | 61300 | 110200 | 1.8 | 95 |
| iPP-PCL8 | 2 | 500/1/1 | 5 | 100 | 38100 | 68700 | 1.8 | 93 |
| iPP-PCL9 | 2 | 250/1/1 | 5 | 100 | 18200 | 35700 | 2.0 | 91 |
| iPP-PCL10 | 2 | 1000/1/1 | 2 | 100 | 40400 | 76400 | 1.9 | 66 |
| iPP-PCL11 | 2 | 500/1/1 | 2 | 100 | 39400 | 68300 | 1.7 | 93 |
| iPP-PCL12 | 2 | 250/1/1 | 2 | 100 | 22200 | 43500 | 2.0 | 92 |
| iPP-PCL13* | 1 | 250/1/1 | 2 | 100 | 16000 | 31000 | 1.9 | 91 |
| iPP-PCL14* | 1 | 250/1/1 | 5 | 100 | 27200 | 51200 | 1.9 | 90 |
| iPP-PCL15* | 1 | 500/1/1 | 2 | 100 | 34400 | 60700 | 1.8 | 72 |
| iPP-PCL16* | 1 | 500/1/1 | 5 | 100 | 32400 | 60500 | 1.9 | 93 |
| iPP-PCL17* | 1 | 1000/1/1 | 2 | 100 | 37400 | 73400 | 2.0 | 93 |
| iPP-PCL18* | 1 | 1000/1/1 | 5 | 100 | 47800 | 84700 | 1.8 | 92 |
| iPP-PCL19* | 2 | 1000/1/1 | 5 | 100 | 68800 | 116400 | 1.7 | 94 |
| iPP-PCL20* | 2 | 500/1/1 | 5 | 100 | 41600 | 77700 | 1.9 | 95 |
| iPP-PCL21* | 2 | 250/1/1 | 5 | 100 | 29600 | 54400 | 1.8 | 91 |
| iPP-PCL22* | 2 | 1000/1/1 | 2 | 100 | 68200 | 122700 | 1.8 | 95 |
| iPP-PCL23* | 2 | 500/1/1 | 2 | 100 | 49500 | 89500 | 1.8 | 95 |
| iPP-PCL24* | 2 | 250/1/1 | 2 | 100 | 19300 | 36400 | 1.9 | 91 |
| iPP-PCL25 | 3 | 250/1/1 | 5 | 100 | 10230 | 17157 | 1.7 | 38 |

For the reactions marked with * the catalyst was reacted with the initiator/first block at 100° C. for 24 h prior to ROP.

Example 11

Typical procedure for synthesis of iPP-b-PPDL copolymers: A glass crimp cap vial was charged with toluene (1.5 mL), PDL (1.08 g, 4.5 mmol), hydroxyl end-capped iPP (17.4 mg, 8.7 µmol) and catalyst 2 (3.05 mg, 8.7 µmol). All manipulations were carried out in the glovebox. Then, the mixture was removed from the glovebox and stirred in an oil bath at 100° C. The progress of the reaction was followed by $^1$H NMR spectroscopy by taking aliquots at set time intervals. The synthesized copolymer was cooled to room temperature and quenched using acidified methanol, isolated and dried in vacuum at room temperature for 18 h. Table 4, entries iPP-PPDL1-iPP-PPDL9 specify the reaction conditions, molecular weight ($M_n$ and $M_w$), Đ and the PDL conversion for the present example.

Example 12

The same procedure was used as for example 11, with this difference that 2 was premixed with the hydroxyl end-capped iPP for 24 h at 100° C. prior to ROP. Table 4, entries iPP-PPDL10-iPP-PPDL15 specify the reaction conditions, molecular weight ($M_n$ and $M_w$), Đ and the PDL conversion for the present example.

Example 13

The same procedure was used as for example 11, with this difference that catalyst 1 was used instead of 2 and that 1 was premixed with the hydroxyl end-capped iPP for 24 h at 100° C. Table 4, entries iPP-PPDL16-iPP-PPDL20 specify the reaction conditions, molecular weight ($M_n$ and $M_w$), Đ and the PDL conversion for the present example.

TABLE 4

Ring-opening polymerization of PDL initiated by hydroxyl-end capped iPP affording iPP-b-PPDL block copolymers.

| entry | cat. | PDL/cat./initiator | time [h] | T [° C.] | $M_n$ [g/mol] | $M_w$ [g/mol] | Đ | conv. [%] |
|---|---|---|---|---|---|---|---|---|
| iPP-PPDL1 | 2 | 250/1/1 | 2 | 100 | 57906 | 107022 | 1.9 | 49 |
| iPP-PPDL2 | 2 | 250/1/1 | 5 | 100 | 35991 | 70338 | 2.0 | 77 |
| iPP-PPDL3 | 2 | 500/1/1 | 2 | 100 | 8786 | 17591 | 2.0 | 18 |
| iPP-PPDL4 | 2 | 500/1/1 | 5 | 100 | 63193 | 122632 | 1.9 | 68 |
| iPP-PPDL5 | 2 | 250/1/1 | 24 | 100 | 60365 | 98079 | 1.6 | 95 |
| iPP-PPDL6 | 2 | 500/1/1 | 24 | 100 | 82483 | 149488 | 1.8 | 90 |
| iPP-PPDL7 | 2 | 1000/1/1 | 24 | 100 | 102906 | 187201 | 1.8 | 91 |
| iPP-PPDL8 | 2 | 500/1/1.2 | 24 | 100 | 64643 | 124188 | 1.9 | 86 |
| iPP-PPDL9 | 2 | 1000/1/1.2 | 24 | 100 | 2728 | 15206 | 5.6 | 10 |
| iPP-PPDL10* | 2 | 250/1/1 | 2 | 100 | 7301 | 23323 | 3.2 | 38 |
| iPP-PPDL11* | 2 | 500/1/1 | 2 | 100 | 4860 | 14339 | 3.0 | 39 |
| iPP-PPDL12* | 2 | 1000/1/1 | 2 | 100 | 5203 | 18039 | 3.5 | 22 |
| iPP-PPDL13* | 2 | 250/1/1 | 5 | 100 | 33659 | 64170 | 1.9 | 19 |
| iPP-PPDL14* | 2 | 500/1/1 | 5 | 100 | 38402 | 69637 | 1.8 | 61 |
| iPP-PPDL15* | 2 | 1000/1/1 | 5 | 100 | 54029 | 80752 | 1.8 | 64 |
| iPP-PPDL16* | 1 | 250/1/1 | 2 | 100 | 14321 | 25906 | 1.8 | 32 |
| iPP-PPDL17* | 1 | 500/1/1 | 2 | 100 | 17635 | 29213 | 1.7 | 28 |
| iPP-PPDL18* | 1 | 1000/1/1 | 2 | 100 | traces of product | | | |
| iPP-PPDL19* | 1 | 250/1/1 | 5 | 100 | 33801 | 65196 | 1.9 | 75 |
| iPP-PPDL20* | 1 | 500/1/1 | 5 | 100 | 27246 | 47404 | 1.7 | 38 |

For the reactions marked with * the catalyst was reacted with the initiator at 100° C. for 24 h.

Example 15

Typical procedure for synthesis of iPP-b-PBA copolymers: A glass crimp cap vial was charged with toluene (1.5 mL), cyclic butylene adipate (BA) (0.9 g, 4.5 mmol), hydroxyl end-capped iPP (17.4 mg, 8.7 µmol) and catalyst 2 (~3.05 mg, 8.7 µmol). All manipulations were carried out in the glovebox. Then, the mixture was removed from the glovebox and stirred in an oil bath at 100° C. The progress of the react ion was followed by $^1$H NMR spectroscopy by taking aliquots at set time intervals. The synthesized copolymer was cooled to room temperature and quenched using acidified methanol, isolated and dried in vacuum at room temperature for 18 h. Table 5, entries iPP-PBA1-iPP-PBA6 specify the reaction conditions, molecular weight ($M_n$ and $M_w$), Đ and the BA conversion for the present example.

Example 16

The same procedure was used as for example 15, with this difference that BA was used together with CL with the molar ratio 1:1. Table 5, entries iPP-poly(BA-CL)1-iPP-poly(BA-CL)6 specify the reaction conditions, molecular weight ($M_n$ and $M_w$), Đ and the monomers conversion for the present example.

TABLE 5

Ring-opening polymerization of BA or BA plus PCL, initiated by hydroxyl-end capped iPP affording iPP-b-PBA or iPP-b-poly(BA-co-CL) block copolymers.

| entry | cat. | mon/cat./init. | time [h] | T [° C.] | $M_n$ [g/mol] | $M_w$ [g/mol] | Đ | conv. [%] |
|---|---|---|---|---|---|---|---|---|
| iPP-PBA1 | 2 | 500/1/1 | 2 | 100 | 2560 | 4810 | 1.9 | 95 |
| iPP-PBA2 | 2 | 1000/1/1 | 2 | 100 | 1780 | 3570 | 2.0 | 93 |
| iPP-PBA3 | 2 | 500/1/1 | 5 | 100 | 8870 | 11230 | 1.3 | 91 |
| iPP-PBA4 | 2 | 1000/1/1 | 5 | 100 | 25800 | 43400 | 1.7 | 29 |
| iPP-PBA5 | 2 | 500/1/1 | 24 | 100 | 12800 | 48900 | 3.8 | 97 |
| iPP-PBA6 | 2 | 1000/1/1 | 24 | 100 | 27100 | 81500 | 3.0 | 94 |
| iPP-poly(BA-CL)1 | 2 | 500/1/1 | 2 | 100 | 6840 | 15190 | 2.2 | 94 |
| iPP-poly(BA-CL)2 | 2 | 1000/1/1 | 2 | 100 | 47150 | 81100 | 1.7 | 92 |
| iPP-poly(BA-CL)3 | 2 | 500/1/1 | 5 | 100 | 12480 | 36500 | 2.9 | 90 |
| iPP-poly(BA-CL)4 | 2 | 1000/1/1 | 5 | 100 | 51090 | 84390 | 1.6 | 92 |
| iPP-poly(BA-CL)5 | 2 | 500/1/1 | 24 | 100 | 17100 | 72100 | 4.2 | 95 |
| iPP-poly(BA-CL)6 | 2 | 1000/1/1 | 24 | 100 | 25900 | 115900 | 4.5 | 93 |

Example 17

Typical procedure for synthesis of iPP-b-PBS copolymers: A glass crimp cap vial was charged with toluene (1.5 mL), cyclic butylene succinate (BS) (0.77 g, 4.5 mmol), hydroxyl end-capped iPP (17.4 mg, 8.7 μmol) and catalyst 2 (~3.05 mg, 8.7 μmol). All manipulations were carried out in the glovebox. Then, the mixture was removed from the glovebox and stirred in an oil bath at 100° C. The progress of the reaction was followed by $^1$H NMR spectroscopy by taking aliquots at set time intervals. The synthesized copolymer was cooled to room temperature and quenched using acidified methanol, isolated and dried in vacuum at room temperature for 18 h. Table 6, entries iPP-PBS1-iPP-PBS4 specify the reaction conditions, molecular weight ($M_n$ and $M_w$), Đ and the BS conversion for the present example.

Example 18

The same procedure was used as for example 17, with this difference that BS was used together with CL with the molar ratio 1:1. Table 6, entries iPP-poly(BS-CL)1-iPP-poly(BS-CL)4 specify the reaction conditions, molecular weight ($M_n$ and $M_w$), Đ and the monomers conversion for the present example.

TABLE 6

Ring-opening polymerization of BS or BS plus CL initiated by hydroxyl-end capped iPP affording iPP-b-PBS or iPP-b-poly(BS-co-CL) block copolymers.

| entry | cat. | mon/cat./init. | time [h] | T [° C.] | $M_n$ [g/mol] | $M_w$ [g/mol] | Đ | conv. [%] |
|---|---|---|---|---|---|---|---|---|
| iPP-PBS1 | 2 | 500/1/1 | 2 | 100 | 7970 | 13100 | 1.6 | 99 |
| iPP-PBS2 | 2 | 1000/1/1 | 2 | 100 | 1270 | 4550 | 3.6 | 99 |
| iPP-PBS3 | 2 | 500/1/1 | 5 | 100 | 5680 | 9760 | 1.7 | 99 |
| iPP-PBS4 | 2 | 1000/1/1 | 5 | 100 | 1500 | 5510 | 3.7 | 99 |
| iPP-poly(BS-CL)1 | 2 | 500/1/1 | 2 | 100 | 20100 | 60800 | 3.0 | 99 |
| iPP-poly(BS-CL)2 | 2 | 1000/1/1 | 2 | 100 | 33100 | 92600 | 2.8 | 99 |
| iPP-poly(BS-CL)3 | 2 | 500/1/1 | 5 | 100 | 21800 | 63000 | 2.9 | 99 |
| iPP-poly(BS-CL)4 | 2 | 1000/1/1 | 5 | 100 | 5520 | 150500 | 2.7 | 99 |

Example 19

Typical procedure for synthesis of iPP-b-PEB copolymers: A glass crimp cap vial was charged with toluene (1.5 mL), cyclic ethylene brassylate (EB) (1.21 g, 4.5 mmol), hydroxyl end-capped iPP (17.4 mg, 8.7 μmol) and catalyst 2 (~3.05 mg, 8.7 μmol). All manipulations were carried out in the glovebox. Then, the mixture was removed from the glovebox and stirred in an oil bath at 100° C. The progress of the reaction was followed by $^1$H NMR spectroscopy by taking aliquots at set time intervals. The synthesized copolymer was cooled to room temperature and quenched using acidified methanol, isolated and dried in vacuum at room temperature for 18 h. Table 7, entries iPP-PEB1-iPP-PEB4 specify the reaction conditions, molecular weight ($M_n$ and $M_w$), Đ and the EB conversion for the present example.

TABLE 7

Ring-opening polymerization of EB initiated by hydroxyl-end capped iPP affording iPP-b-PEB block copolymers.

| entry | cat. | mon/cat./init. | time [h] | T [° C.] | $M_n$ [g/mol] | $M_w$ [g/mol] | Đ | conv. [%] |
|---|---|---|---|---|---|---|---|---|
| iPP-PEB1 | 2 | 500/1/1 | 5 | 100 | 66200 | 134100 | 2.0 | 90 |
| iPP-PEB2 | 2 | 1000/1/1 | 5 | 100 | 90400 | 167700 | 1.9 | 70 |
| iPP-PEB3 | 2 | 500/1/1 | 24 | 100 | 62300 | 230300 | 2.2 | 97 |
| iPP-PEB4 | 2 | 1000/1/1 | 24 | 100 | 75400 | 157500 | 2.1 | 97 |

Example 20

Typical procedure for synthesis of iPP-b-PBT copolymers: A glass crimp cap vial was charged with toluene (1.5 mL), cyclic butylene terephthalate (BT) (0.99 g, 4.5 mmol), hydroxyl end-capped iPP (17.4 mg, 8.7 μmol) and catalyst 2 (~3.05 mg, 8.7 μmol). All manipulations were carried out in the glovebox. Then, the mixture was removed from the glovebox and stirred in an oil bath at 100° C. or 80° C. Then, the mixture was removed from the glovebox and stirred in an oil bath at 100° C. The progress of the reaction was followed by $^1$H NMR spectroscopy by taking aliquots at set time intervals. The synthesized copolymer was cooled to room temperature and quenched using acidified methanol, isolated and dried in vacuum at room temperature for 18 h. Table 8, entries iPP-PBT1-iPP-PBT4 specify the reaction conditions, molecular weight ($M_n$ and $M_w$), Đ and the BT conversion for the present example.

TABLE 8

Ring-opening polymerization of BT initiated by hydroxyl-end capped iPP affording iPP-b-PBT block copolymers.

| entry | cat. | mon/cat./init. | time [h] | T [° C.] | conv. [%] |
|---|---|---|---|---|---|
| iPP-PCBT1 | 2 | 500/1/1 | 5 | 100 | 97 |
| iPP-PCBT2 | 2 | 1000/1/1 | 5 | 100 | 97 |
| iPP-PCBT3 | 2 | 500/1/1 | 24 | 100 | 93 |
| iPP-PCBT4 | 2 | 1000/1/1 | 24 | 100 | 94 |

From the above, the following can be observed. With the method according to the present method a large variety of block copolymers can be obtained by tuning the first polyolefin block and by tuning the monomer used in the preparation of the second block. Moreover, several catalyst may be used to prepare the second polymer block.

Analytical Techniques $^1$H NMR analysis ($^1$H-NMR) carried out at 80-110° C. using deuterated tetrachloroethene (TCE-$d_2$) as the solvent and recorded in 5 mm tubes on a Varian Mercury spectrometer operating at frequencies of 400 MHz. Chemical shifts are reported in ppm versus tetramethylsilane and were determined by reference to the residual solvent.

Heteronuclear multiple-bond correlation spectra (HMBC) were recorded with pulse field gradients. The spectral windows for $^1$H and $^{13}$C axes were 6075.3 and 21367.4 Hz, respectively. The data were collected in a 2560×210 matrix and processed in a 1K×1K matrix. The spectra were recorded with the acquisition time 0.211 s, relaxation delay 1.4 s and number of scans equal to 144×210 increments.

Solid-state $^{13}$C{$^1$H} Cross-Polarization/Magic-Angle Spinning (CP/MAS) NMR and $^{13}$C{$^1$H} Insensitive Nuclei Enhanced by Polarization Transfer (INEPT) experiments were carried out on a Bruker AVANCE-III 500 spectrometer employing a double-resonance H-X probe for rotors with 2.5 mm outside diameter. These experiments utilized a MAS frequency of 25.0 kHz, a 2.5 µs π/2 pulse for $^1$H and $^{13}$C, a CP contact time of 2.0 ms and TPPM decoupling during acquisition. The CP conditions were pre-optimized using L-alanine. The $^{13}$C{$^1$H} INEPT spectra were recorded using the refocused-INEPT sequence with a J-evolution period of either ⅓ $J_{CH}$ or ⅙ $J_{CH}$ assuming a 1 $J_{CH}$ of 150 Hz, i.e. for a J-evolution time of ⅓ $J_{CH}$ the signals from CH and CH$_3$ groups are positive, while those of CH$_2$ are negative.

Size exclusion chromatography (SEC). The molecular weight in kg/mol and the Đ were determined by means of high temperature size exclusion chromatography which was performed at 160° C. using a high speed GPC (Freesla te, Sunnyvale, USA). Detection: IR4 (PolymerChar, Valencia, Spain). Column set: three Polymer Laboratories 13 µm PLgel Olexis, 300×7.5 mm. 1,2,4-Trichlorobenzene (TCB) was used as eluent at a flow rate of 1 mL·min$^{-1}$. TCB was freshly distilled prior to use. The molecular weights and the corresponding Đ were calculated from HT SEC analysis with respect to narrow polyethylene standards (PSS, Mainz, Germany). Size exclusion chromatography (SEC) of block copolymers was performed at 160° C. o n a Polymer Laboratories PLXT-20 Rapid GPC Polymer Analysis System (refractive index detector and viscosity detector) with 3 PLgel Olexis (300×7.5 mm, Polymer Laboratories) columns in series. 1,2,4-Trichlorobenzene was used as eluent at a flow rate of 1 mL·min$^{-1}$. The molecular weights were calculated with respect to polyethylene standards (Polymer Laboratories). A Polymer Laboratories PL XT-220 robotic sample handling system was used as autosampler.

The invention claimed is:

1. A process for the preparation of a block copolymer comprising a first type of polyolefin block and at least one type of second polymer block, the process comprising the steps of:
   A) polymerizing at least one type of olefin monomer using a catalyst system to obtain a first polyolefin block containing a main group metal on at least one chain end; the catalyst system comprising:
      i) a metal catalyst or metal catalyst precursor comprising a metal from Group 3-10 of the IUPAC Periodic Table of elements; and
      ii) at least one type of chain transfer agent; and
      iii) optionally a co-catalyst;
   B) reacting the first polyolefin block containing a main group metal on at least one chain end obtained in step A) with at least one type of oxidizing agent and subsequently at least one type of metal substituting agent to obtain a first polyolefin block containing at least one functionalized chain end;
   C) forming at least one second polymer block on the first polyolefin block, wherein as an initiator the functionalized chain end of the first polyolefin block obtained in step B) is used to obtain the block copolymer,
   wherein step C) of obtaining a block copolymer is carried out by a combination of ROP using at least one type of cyclic monomer and at least one transesterification reaction at a carbonyl group-containing functionality of at least one type of second polymer.

2. The process according to claim 1, wherein the metal catalyst or metal catalyst precursor used in step A) comprises a metal from Group 3-8 of the IUPAC Periodic Table of elements and/or wherein the metal catalyst or metal catalyst precursor used in step A) comprises a metal selected from the group consisting of Ti, Zr, Hf, V, Cr, Fe, Co, Ni, Pd.

3. The process according to claim 1, wherein the co-catalyst is selected from the group consisting of MAO, DMAO, MMAO, SMAO, fluorinated aryl borane or fluorinated aryl borate.

4. The process according to claim 1, wherein the olefin monomer used in step A) is selected from the group consisting of ethylene, propylene, 1-butene, 4-methyl-1-pentene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-cyclopentene, cyclohexene, norbornene, ethylidene-norbornene, and vinylidene-norbornene and one or more combinations thereof.

5. The process according to claim 1, wherein the second polymer block is selected from the group consisting of a polyester, a polycarbonate, a polyamide, a polyurethane, a polyurea, a random or block poly(carbonate-ester), poly (carbonate-ether), poly(ester-ether), poly(carbonate-ether-ester), poly(ester-amide), poly(ester-ether-amide), poly(carbonate-amide), poly(carbonate-ether-amide), poly(ester-urethane), poly(ester-ether-urethane), poly(carbonate-urethane), poly(carbonate-ether-urethane), poly(ester-urea), poly(ester-ether-urea), poly(carbonate-urea), poly(carbonate-ether-urea), poly(ether-amide), poly(amide-urethane), poly(amide-urea), poly(urethane-urea).

6. The process according to claim 1, wherein the chain transfer agent is a main group metal hydrocarbyl or a main group metal hydride.

7. The process according to claim 6, wherein the chain transfer agent is selected from the group consisting of trialkyl boron, dialkyl boron halide, dialkyl boron hydride, diaryl boron hydride, dialkyl boron alkoxide, dialkyl boron aryloxide, dialkyl boron amide, dialkyl boron thiolate, dialkyl boron carboxylate, dialkyl boron phosphide, dialkyl boron mercaptanate, dialkyl boron siloxide, dialkyl boron stannate, alkyl boron dialkoxide, alkyl boron diaryloxide, alkyl boron dicarboxylate, alkyl boron diphosphide, alkyl boron dimercaptanate, alkyl boron disiloxide, alkyl boron distannate, boron hydride dialkoxide, boron hydride diaryloxide, boron hydride diamide, boron hydride dicarboxylate, boron hydride diphosphide, boron hydride dimercaptanate, boron hydride disiloxide, boron hydride distannate, trialkyl aluminum, dialkyl aluminum halide, dialkyl aluminum hydride, dialkyl aluminum alkoxide, dialkyl aluminum aryloxide, dialkyl aluminum amide, dialkyl aluminum thiolate, dialkyl aluminum carboxylate, dialkyl aluminum phosphide, dialkyl aluminum mercaptanate, dialkyl aluminum siloxide, dialkyl aluminum stannate, alkyl aluminum dialkoxide, alkyl aluminum diaryloxide, alkyl aluminum dicarboxylate, alkyl aluminum diphosphide, alkyl aluminum dimercaptanate, alkyl aluminum disiloxide, alkyl aluminum distannate, aluminum hydride dialkoxide, aluminum hydride diaryloxide, aluminum hydride diamide, aluminum hydride dicarboxylate, aluminum hydride diphosphide, aluminum hydride dimercaptanate, aluminum hydride disiloxide, aluminum hydride distannate, trialkyl gallium, dialkyl gallium halide, dialkyl gallium hydride, dialkyl gallium alkoxide, dialkyl gallium aryloxide, dialkyl gallium amide, dialkyl gallium thiolate, dialkyl gallium carboxylate, dialkyl gallium phosphide, dialkyl gallium mercaptanate, dialkyl gallium siloxide, dialkyl gallium stannate, dialkyl magnesium, diaryl magnesium, alkyl magnesium halide, alkyl magnesium hydride, alkyl magnesium alkoxide, alkyl magnesium aryloxide, alkyl magnesium amide, alkyl magnesium thiolate, alkyl magnesium carboxylate, alkyl magnesium phosphide, alkyl magnesium mercaptanate, alkyl magnesium siloxide, alkyl magnesium stannate, dialkyl calcium, alkyl calcium halide, alkyl calcium hydride, alkyl calcium alkoxide, alkyl calcium aryloxide, alkyl calcium amide, alkyl calcium thiolate, alkyl calcium carboxylate, alkyl calcium phosphide, alkyl calcium mercaptanate, alkyl calcium siloxide, alkyl calcium stannate, dialkyl zinc, alkyl zinc halide, alkyl zinc hydride, alkyl zinc alkoxide, alkyl zinc aryloxide, alkyl zinc amide, alkyl zinc thiolate, alkyl zinc carboxylate, alkyl zinc phosphide, alkyl zinc mercaptanate, alkyl zinc siloxide, alkyl zinc stannate, and or more combinations thereof.

8. The process according to claim 1, wherein the oxidizing agent in step B) is selected from the group consisting of $O_2$, CO, $O_3$, $CO_2$, $CS_2$, COS, $R^2NCO$, $R^2NCS$, $R^2NCNR^1$, $CH_2=C(R^2)C(=O)OR^3$, $CH_2=C(R^2)(C=O)N(R^3)R^4$, $CH_2=C(R^2)P(=O)(OR^3)OR^4$, $N_2O$, $R^2CN$, $R^2NC$, epoxide, aziridine, cyclic anhydride, $R^3R^4C=NR^2$, $SO_3$, and $R^2C(=O)R^3$, or a combination of $NH_3$ and NaClO or a combination of $H_2O_2$ and NaOH, where $R^2$, $R^3$, $R^4$, $R^5$ and $R^6$ are each independently selected from hydrogen or $SiR^7_3$, $SnR^7_3$ or a C1-C16 hydrocarbyl; where each $R^7$ is independently selected from hydride, halide or C1-C16 hydrocarbyl.

9. The process according to claim 6, wherein the chain transfer agent is selected from the group consisting of: hydrocarbyl aluminum, hydrocarbyl magnesium, hydrocarbyl zinc, hydrocarbyl gallium, hydrocarbyl boron, hydrocarbyl calcium, aluminum hydride, magnesium hydride, zinc hydride, gallium hydride, boron hydride, calcium hydride and one or more combinations thereof.

10. The process according to claim 7, wherein the chain transfer agent is selected from the group consisting of trimethyl aluminum (TMA), triethyl aluminum (TEA), triisobutyl aluminum, tri(t-butyl) aluminum, di(isobutyl) aluminum hydride, di(n-butyl) magnesium, n-butyl(ethyl)magnesium, benzyl calcium 2,6-di(t-butyl)-4-methyl-phenoxide, dimethyl zinc, diethyl zinc, trimethyl gallium, or triethylboron, 9-borabicyclo(3.3.1)nonane, catecholborane, and diborane and one or more combination thereof.

11. The process according to claim 8, wherein the oxidizing agent in step B) is selected from the group consisting of $O_2$, $O_3$, $N_2O$, epoxide, aziridine, $CH_2=C(R^2)C(=O)OR^3$, $CH_2=C(R^2)(C=O)N(R^3)R^4$, $CH_2=C(R^2)P(=O)(OR^3)OR^4$, $R^2C(=O)R^3$, $R^3R^4C=NR^2$, a combination of $NH_3$ and NaClO or a combination of $H_2O_2$ and NaOH, where $R^2$, $R^3$, $R^4$, $R^5$ and $R^6$ are each independently selected from hydrogen or $SiR^7_3$, $SnR^7_3$ or a C1-C16 hydrocarbyl; where each $R^7$ is independently selected from hydride, halide or C1-C16 hydrocarbyl.

12. The process according to claim 1, wherein the main group metal of the first polyolefin block containing the main group metal on at least one chain end is derived from the at least one chain transfer agent.

* * * * *